US012319552B2

(12) United States Patent
Perlstein

(10) Patent No.: US 12,319,552 B2
(45) **Date of Patent: *Jun. 3, 2025**

(54) TWO-POST VEHICLE LIFT AND ADAPTER SYSTEM FOR MATERIAL HANDLING VEHICLES

(71) Applicant: Mohawk Lifts, LLC, Amsterdam, NY (US)

(72) Inventor: Zachary Perlstein, Amsterdam, NY (US)

(73) Assignee: MOHAWK LIFTS, LLC, Amsterdam, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/328,640

(22) Filed: Jun. 2, 2023

(65) Prior Publication Data

US 2023/0303369 A1 Sep. 28, 2023

Related U.S. Application Data

(62) Division of application No. 16/555,327, filed on Aug. 29, 2019, now Pat. No. 11,667,501.

(Continued)

(51) Int. Cl.

*B66F 3/46* (2006.01)
*B66F 7/20* (2006.01)

(Continued)

(52) U.S. Cl.

CPC .................. *B66F 3/46* (2013.01); *B66F 7/20* (2013.01); *B66F 7/28* (2013.01); *B66F 13/00* (2013.01); *B66F 2700/123* (2013.01)

(58) Field of Classification Search

CPC ...... B66F 7/28; B66F 3/46; B66F 7/20; B66F 2700/123; B66F 7/04; B66F 7/025;

(Continued)

(56) References Cited

U.S. PATENT DOCUMENTS

| | | | | | |
|---|---|---|---|---|---|
| 2,769,508 | A * | 11/1956 | Pelouch | B66F 7/18 | 187/218 |
| 2,949,978 | A * | 8/1960 | Halstead | B66F 7/18 | 187/219 |

(Continued)

FOREIGN PATENT DOCUMENTS

| | | | | |
|---|---|---|---|---|
| EP | 4169867 A1 * | 4/2023 | | B66F 7/04 |
| KR | 20220005248 A * | 1/2022 | | |
| KR | 102449493 B1 * | 9/2022 | | |

OTHER PUBLICATIONS

For The Vehicle And The Load Ascending And Descending Of Lifting Device; Document ID: CN 105307969 A; Date Published: Feb. 3, 2016; Inventor: Benz, D; Date Filed: Jun. 27, 2014 (Year: 2016).*

(Continued)

*Primary Examiner* — Mahdi H Nejad
(74) *Attorney, Agent, or Firm* — HESLLIN ROTHENBERG FARLEY & MESITI P.C.

(57) ABSTRACT

A low profile adapter is removably engageable with a two-post vehicle lift system. The low profile adapter includes a support member. A base plate is rigidly connected to a bottom portion of the support member. The base plate extends longitudinally from a first side of the support member. At least one capture plate is rigidly connected to the support member and extends longitudinally from an opposing second side of the support member. The at least one capture plate is operable to pivotally engage with at least one swing arm platform of the vehicle lift system. The low profile adapter includes one of a height adjustment mechanism and a outrigger arm capture mechanism.

3 Claims, 17 Drawing Sheets

Related U.S. Application Data

(60) Provisional application No. 62/828,570, filed on Apr. 3, 2019, provisional application No. 62/787,795, filed on Jan. 3, 2019, provisional application No. 62/724,268, filed on Aug. 29, 2018.

(51) Int. Cl.
*B66F 7/28* (2006.01)
*B66F 13/00* (2006.01)

(58) Field of Classification Search
CPC .... B66F 13/00; B66F 7/02; B66F 3/02; B66F 3/38; Y10S 254/04
USPC .............................................. 254/133 R, 100
See application file for complete search history.

(56) References Cited

U.S. PATENT DOCUMENTS

| | | | | | |
|---|---|---|---|---|---|
| 3,993,286 | A * | 11/1976 | Greene | B66F 5/04 | 254/8 B |
| 4,653,727 | A * | 3/1987 | Chang | B66F 3/12 | 254/1 |
| 4,964,617 | A * | 10/1990 | Lawrence | B66F 5/04 | 254/133 R |
| 5,201,494 | A * | 4/1993 | Lundman | B66F 5/04 | 254/8 B |
| 5,947,447 | A * | 9/1999 | Sorensen | B66F 5/04 | 254/8 B |
| D453,983 | S * | 2/2002 | Lin | D34/31 | |
| 6,375,160 | B1 * | 4/2002 | Hung | B66F 5/00 | 254/133 R |
| 7,168,685 | B2 * | 1/2007 | Miner | B66F 5/00 | 254/8 B |
| 7,588,341 | B2 * | 9/2009 | Lin | A47G 19/2227 | 254/45 |
| D720,915 | S * | 1/2015 | Fox | D34/31 | |
| 9,624,077 | B1 * | 4/2017 | Jordan | B66F 7/0625 | |
| 11,242,204 | B1 * | 2/2022 | Zsido | B66F 3/46 | |
| 2017/0260027 | A1 * | 9/2017 | DeBattiste | B66C 1/12 | |
| 2018/0339890 | A1 | 11/2018 | Perlstein | | |
| 2020/0079627 | A1 | 3/2020 | Perlstein | | |
| 2023/0382700 | A1 * | 11/2023 | Taylor | B66F 7/28 | |
| 2024/0017974 | A1 * | 1/2024 | Stewart | B66C 1/12 | |
| 2024/0359957 | A1 * | 10/2024 | Taylor | B66F 7/28 | |

OTHER PUBLICATIONS

Automobile Double-column Gantry-type Lifting Tray Supporting Mechanism; Patent No. 108128732; Document ID: CN 108128732 A; Date Published: Jun. 8, 2018; Inventor: Qiu, Bo (Year: 2018).*
Rotary Swing Arm Adapters found at: https://www.youtube.com/watch?v =-DZouCMIvrl (Year: 2020).*
Jack Pad Adapter for BMW's; found at https://www.youtube.com/watch?v=oCt-V-kiP_Q (Year: 2024).*

* cited by examiner

TWO-POST VEHICLE LIFT AND ADAPTER SYSTEM FOR MATERIAL HANDLING VEHICLES

CROSS REFERENCE TO RELATED APPLICATIONS

This application is a divisional of, and claims the benefit of, the filing date of U.S. non-provisional application Ser. No. 16/555,327 filed on Aug. 29, 2019; which claims the benefit of the filing dates of: U.S. provisional application 62/724,268 filed on Aug. 29, 2018, U.S. provisional application 62/787,795 filed on Jan. 3, 2019 and U.S. provisional application 62/828,570 filed on Apr. 3, 2019.

TECHNICAL FIELD

The present disclosure relates to lifts for vehicles. More specifically, the disclosure relates to two-post vehicle lifts and adapter systems for engaging and lifting material handling vehicles.

BACKGROUND

The forklift market continues to grow globally, and the number and diversity of design for these vehicles continues to expand to accommodate the growing needs of logistics, warehousing and distribution center businesses. From narrow aisle pickers to pallet jacks and fork lift trucks, material handling vehicles are at the center of the logistics driving the global economy.

Vehicle lifts are often used during vehicle maintenance to access the underside of a vehicle. By raising the vehicle off the ground, maintenance personnel have easier access to perform maintenance from under the vehicle more productively.

However, material handling vehicles include such features as the forks, the mast and outrigger arms. As such, prior art vehicle lifts may encounter problems engaging and lifting vehicles with these additional features.

Accordingly, there is a need for a vehicle lift system that is dedicated to lifting material handling equipment and the additional features they present. Additionally, there is a need for vehicle lift system that includes adapters with relatively low profiles or adapters that can securely capture the outrigger arms, mast and/or forks of various material handling vehicles during a lifting operation.

BRIEF DESCRIPTION

The present disclosure offers advantages and alternatives over the prior art by providing a two-post vehicle lift system and an associated adapter system that are dedicated to lift material handling vehicles. The adapter system includes one of a low profile adapter with a height adjustment mechanism, a low profile adapter with an outrigger arm capture mechanism, and an extended profile adapter with an outrigger arm capture mechanism.

A two-post vehicle lift system in accordance with one or more aspects of the present disclosure includes first and second posts extending longitudinally upwards from a floor. First and second carriages are slidably engaged with the first and second posts respectively. First and second swing arms are pivotally attached to the first carriage. Third and fourth swing arms are pivotally attached to the second carriage. First, second, third and fourth swing arm platforms are engaged with the first, second, third and fourth swing arms respectively. Each swing arm platform is positionable radially relative to its engaged swing arm. An adapter system is engageable with at least one swing arm platform and operable to be positioned to engage and lift a material handling vehicle. The adapter system includes one of a low profile adapter with a height adjustment mechanism, a low profile adapter with an outrigger arm capture mechanism, and an extended profile adapter with an outrigger arm capture mechanism.

A low profile adapter in accordance with one or more aspects of the present disclosure is removably engageable with a two-post vehicle lift system. The low profile adapter includes a support member. A base plate is rigidly connected to a bottom portion of the support member. The base plate extends longitudinally from a first side of the support member. At least one capture plate is rigidly connected to the support member and extends longitudinally from an opposing second side of the support member. The at least one capture plate is operable to pivotally engage with at least one swing arm platform of the vehicle lift system. The low profile adapter includes one of a height adjustment mechanism and a outrigger arm capture mechanism.

An adapter system in accordance with one or more aspects of the present invention is removably engageable with a two-post vehicle lift system. The adapter system includes an extended profile adapter removably engageable with a swing arm platform of a first post and a swing arm platform of a second post of the two-post vehicle lift system. The extended profile adapter includes an outrigger arm capture mechanism. The extended profile adapter is operable to be positioned to engage and lift a material handling vehicle.

BRIEF DESCRIPTION OF DRAWINGS

The disclosure will be more fully understood from the following detailed description taken in conjunction with the accompanying drawings, in which.

DETAILED DESCRIPTION

Certain examples will now be described to provide an overall understanding of the principles of the structure, function, manufacture, and use of the methods, systems, and devices disclosed herein. One or more examples are illustrated in the accompanying drawings. Those skilled in the art will understand that the methods, systems, and devices specifically described herein and illustrated in the accompanying drawings are non-limiting examples and that the scope of the present disclosure is defined solely by the claims. The features illustrated or described in connection with one example maybe combined with the features of other examples. Such modifications and variations are intended to be included within the scope of the present disclosure.

The terms "substantially", "approximately", "about", "relatively," or other such similar terms that may be used throughout this disclosure, including the claims, are used to describe and account for small fluctuations, such as due to variations in processing from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Figure 1:
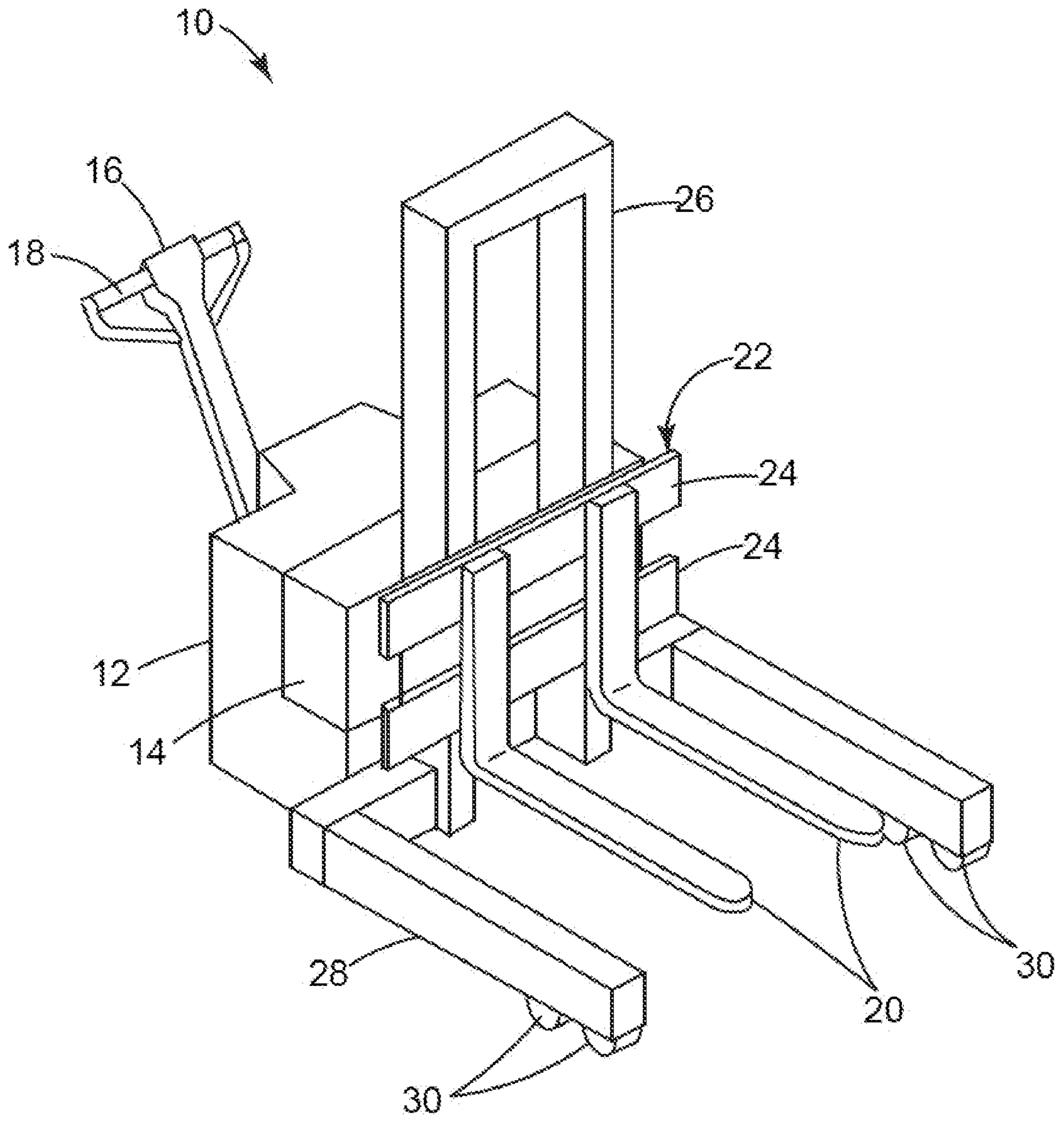
FIG. 1 Prior Art
FIG. 1 depicts an example of a perspective view of a material handling vehicle.

Referring to FIG. 1, an example of a perspective view of a material handling vehicle 10 is depicted. More specifically, FIG. 1 is an example of a class 3 electric motor hand truck. For purposes herein, material handling vehicles will include, without limitation, the following U.S. Occupational Safety and Health Administration (OSHA) classes of forklift trucks:

Class 1: Electric Motor Rider Trucks
Class 2: Electric Motor Narrow Aisle Trucks
Class 3: Electric Motor Hand Trucks
Class 4: Internal Combustion Engine Trucks-Cushion Tires
Class 5: Internal Combustion Engine Trucks-Pneumatic Tires
Class 6: Electric and Internal Combustion Engine Tractors
Class 7 Rough Terrain Forklift Trucks The example of a material handling vehicle 10 illustrated in FIG. 1 includes a power unit 12 electrically connected to a battery 14. The power unit 12 and battery 14 provide (in this case) electric power to drive wheels (not shown), which are controlled by control arm 16 and control handle 18 of the vehicle 10.

Forks 20 are adjustably positioned on a carriage 22 of the vehicle 10. That is, the distance between the forks 20 may be adjusted longitudinally along structural members 24 of the carriage 22 to accommodate different sized loads. The power unit 12 also provides the power required to lift and position the carriage 22 vertically along a mast 26 of the vehicle 10.

In this case, the carriage 22 is lifted electrically, however, other forms of power may be utilized to lift the carriage 22. For example, the carriage 22 may be lifted hydraulically.

Outrigger arms 28 are rigidly connected to the vehicle 10 to provide a brace to any load that the forks 20 must lift. Load wheels 20 located at the distal end portions of the outrigger arms 28 enable the vehicle 10 to maneuver when the forks 20 are carrying a load.

For purposes herein, arms of a pallet jack (such as, for example, a class 3 electric motor hand truck) are considered a type of outrigger arm 28. Such pallet jack arms also include load wheels (such as load wheels 30) located at the distal end portions of the pallet jack arms to enable the pallet jack to maneuver when the pallet jack is carrying a load.

The outrigger arms 28, mast 26 and forks 20 are among the features that are unique to material handling vehicles 10. Such features provide unique challenges to lifting such vehicles 10 off of the ground during maintenance.

For example, the weight distribution of a material handling vehicle may be more toward the back of the vehicle due to the weight of the counterbalance of the forklift. Additionally, the forks, mast and outrigger arms can contribute to an uneven weight distribution of the fork lift truck. The counterbalance, forks, mast and outrigger arms are all features that contribute to a tendency for the vehicle to tip when lifted. Therefore, being able to capture and hold the outrigger arms when the vehicle is being lifted during maintenance would greatly reduce the tendency of the vehicle to tip when lifted.

Also, by way of example, the load wheels 30 often provide a clearance between the bottom of the outrigger arms 28 and the floor that is very small. This clearance may be as small as ¼ of an inch between the outrigger arms and the floor. Such a low clearance can make it difficult to drive the outrigger arms onto lift systems that are designed for vehicles (such as a passenger car) with a much larger clearance.

Moreover, the clearances between floor and many types of material handling vehicles is generally lower than non-material handling vehicles, such as passenger cars. As such lift systems designed to engage and lift non-material handling vehicles often do not have a low enough profile to engage and lift material handling vehicles.

Figure 2:
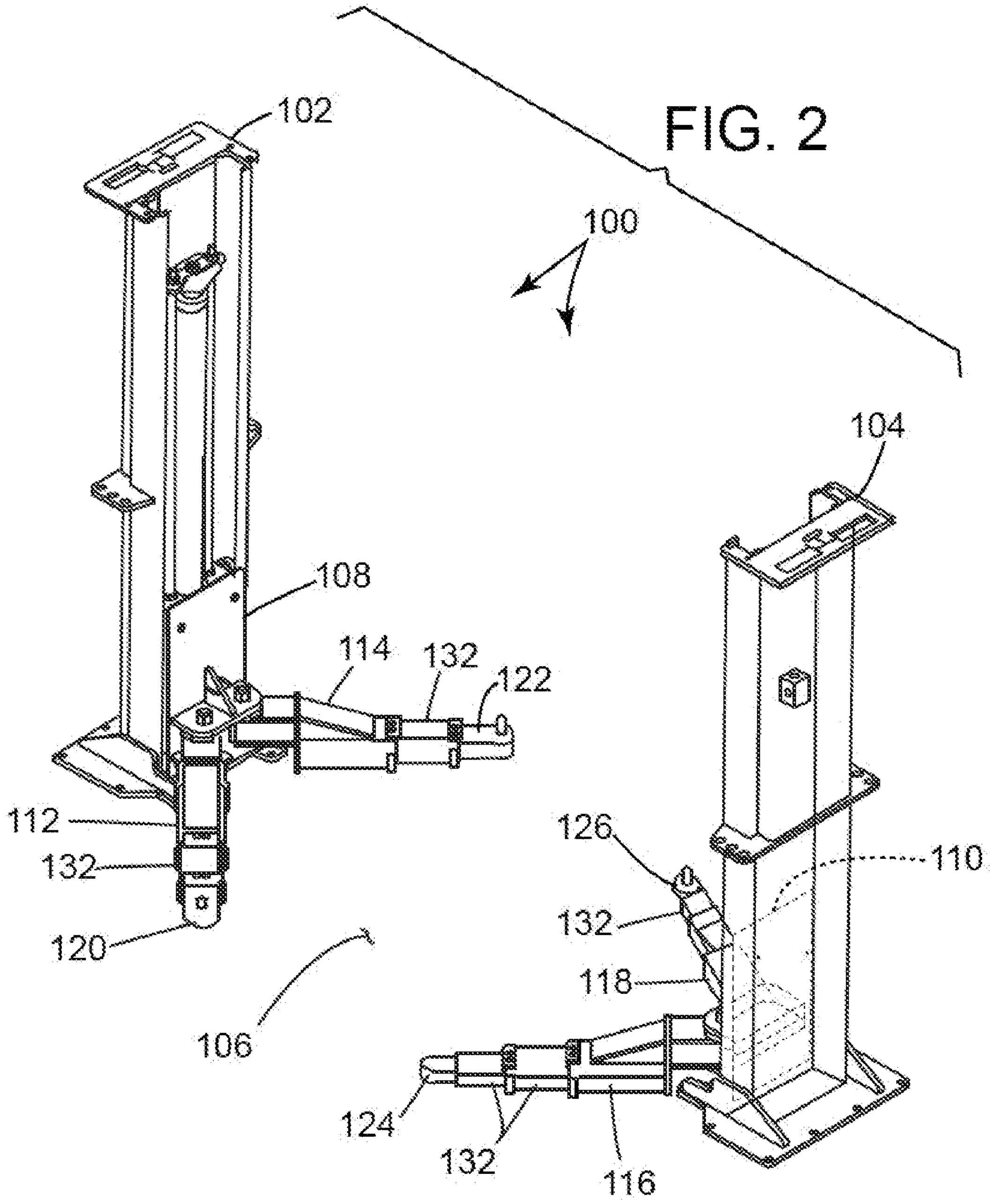
FIG. 2 depicts an example of a perspective view of a two-post vehicle lift system according to aspects disclosed herein.

Referring to FIG. 2, an example of a perspective view of a two-post vehicle lift system 100 is depicted according to aspects disclosed herein. The vehicle lift system 100 includes a first post 102 and a second post 104. The posts 102, 104 extend longitudinally upwards from a floor 106 and may be substantially parallel to each other.

First and second carriages 108, 110 are slidably engaged with the first and second posts 102, 104 respectively. Each carriage 108, 110 is operable to be positioned vertically along its engaged post 102, 104. That is, carriage 108 can be positioned vertically along post 102 and carriage 110 can be positioned vertically along post 104. The carriages 108, 110 may be positioned by hydraulic power, electric power or the like.

A first swing arm 112 and a second swing arm 114 are pivotally attached to the first carriage 108. Additionally, a third swing arm 116 and a fourth swing arm 118 are pivotally attached to the second carriage 110. Each swing arm 112, 114, 116, 118 is operable to swing in a plane of motion that is substantially perpendicular to the posts 102, 104.

First, second, third and fourth swing arm platforms 120, 122, 124, 126 are engaged with the first, second, third and fourth swing arms 112, 114, 116, 118 respectively. In this particular case, each swing arm platform 120, 122, 124, 126 is telescopically engaged with its associated swing arm 112, 114, 116, 118 through one or more slide arms 132. However, a swing arm platform 120, 122, 124, 126 may be engaged directly with an associated swing arm 112, 114, 116, 18 without any slide arms 132 in between.

Each swing arm platform may be positionable radially relative to its engaged swing arm. That is, each swing arm platform may be extended or retracted radially from the swing arm it is engaged with.

Figure 4:
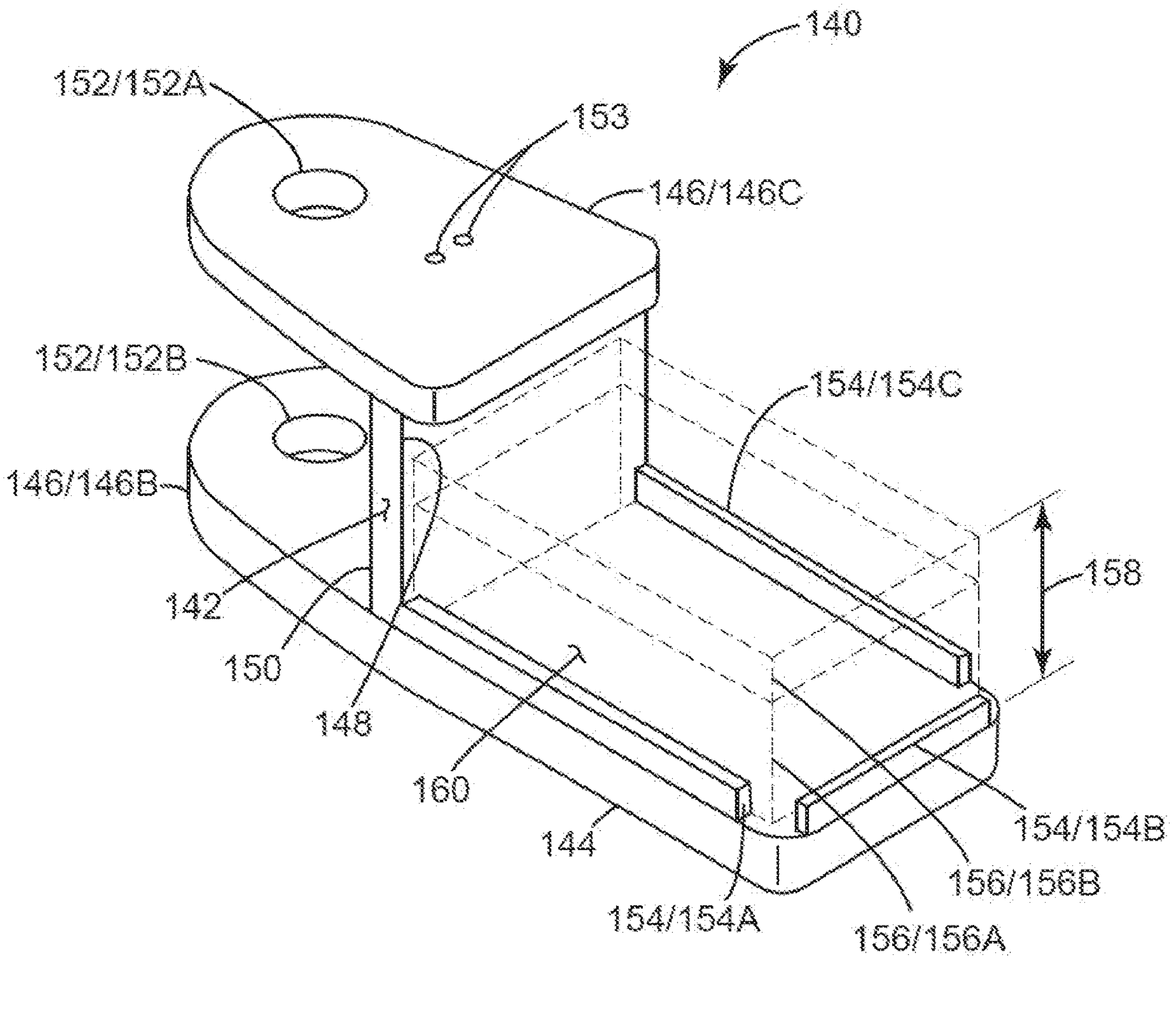
FIG. 4 depicts an example of a perspective view of a low profile adapter according to aspects disclosed herein.
Figure 10:
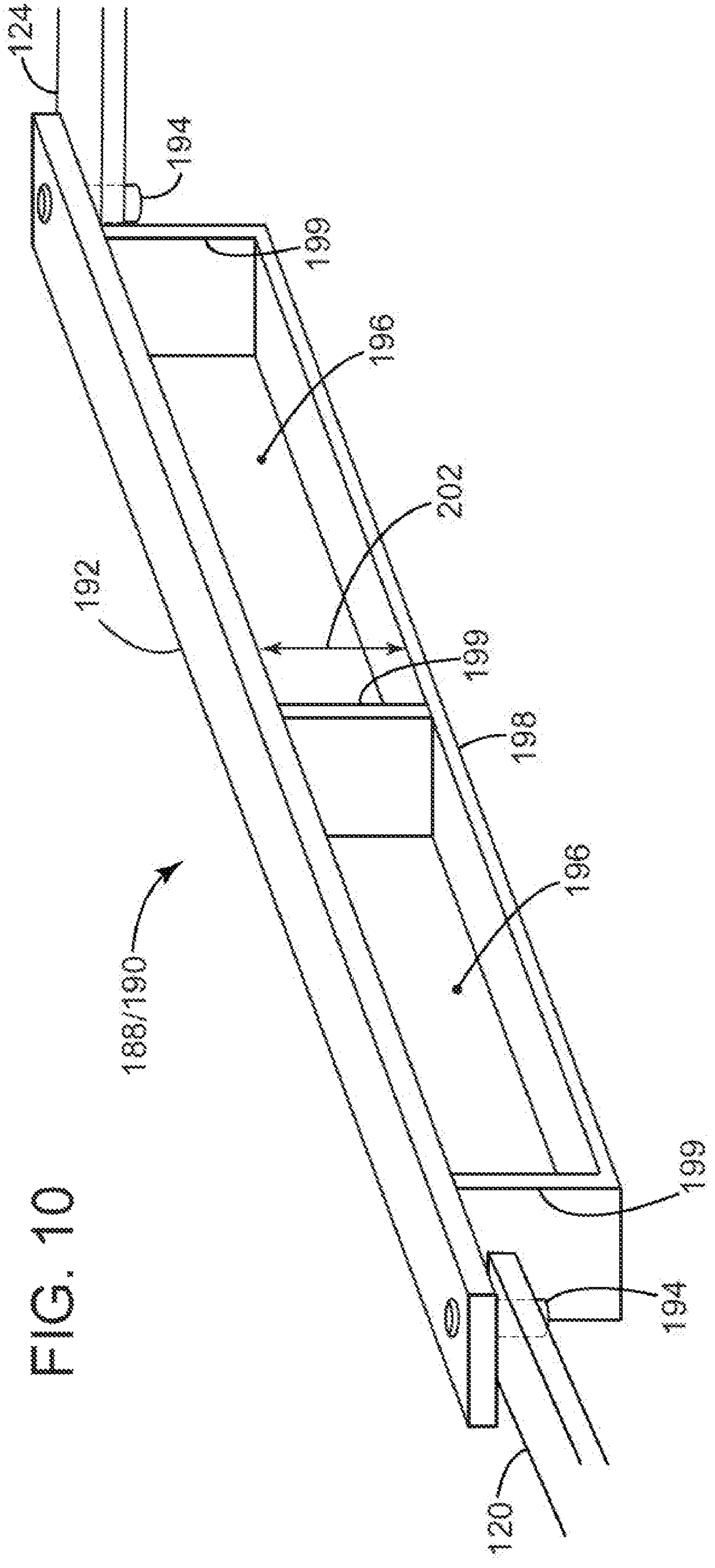
FIG. 10 depicts an example of a perspective view of an extended profile adapter configured as an outrigger adapter according to aspects described herein.

As will be discussed in greater detail herein, an adapter system 170 (best seen in FIGS. 6 and 15) is engageable with at least one swing arm platform 120, 122, 124, 126. The adapter system 170 is operable to be positioned to engage and lift a material handling vehicle (such as material handling vehicle 10). The adapter system 170 includes at least one of:

a low profile adapter 140 with a height adjustment mechanism 154 (best seen in FIG. 4);

a low profile adapter 140 with an outrigger arm capture mechanism 172 (best seen in FIG. 8); or an extended profile adapter 188 with an outrigger arm capture mechanism 196 (best seen in FIG. 10).

Figure 3B:
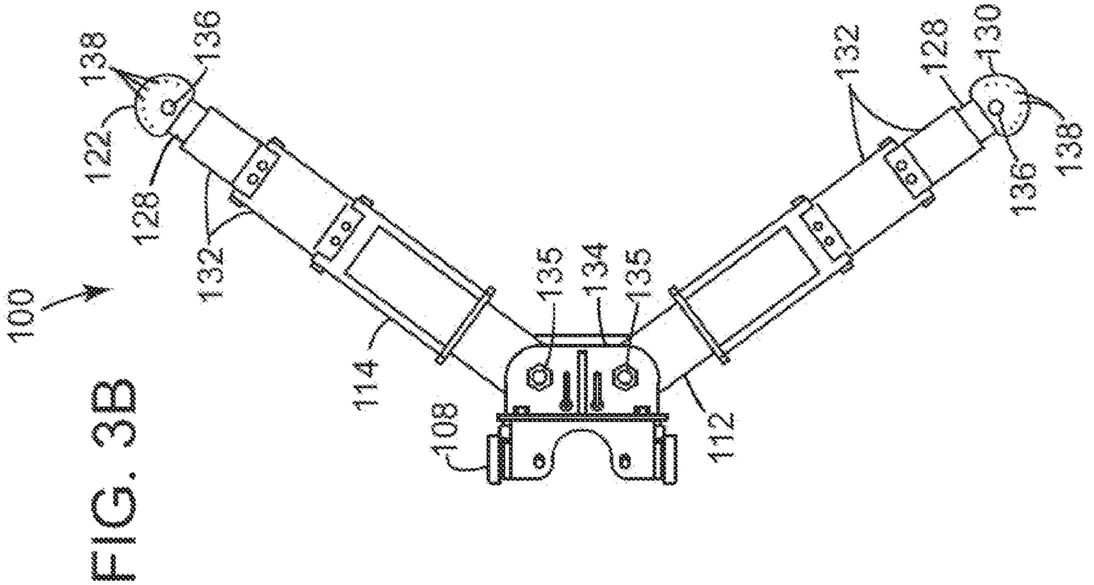
FIG. 3B depicts an example of a top view of the lower portion of the two-post vehicle lift system of FIG. 2 according to aspects disclosed herein.
Figure 3A:
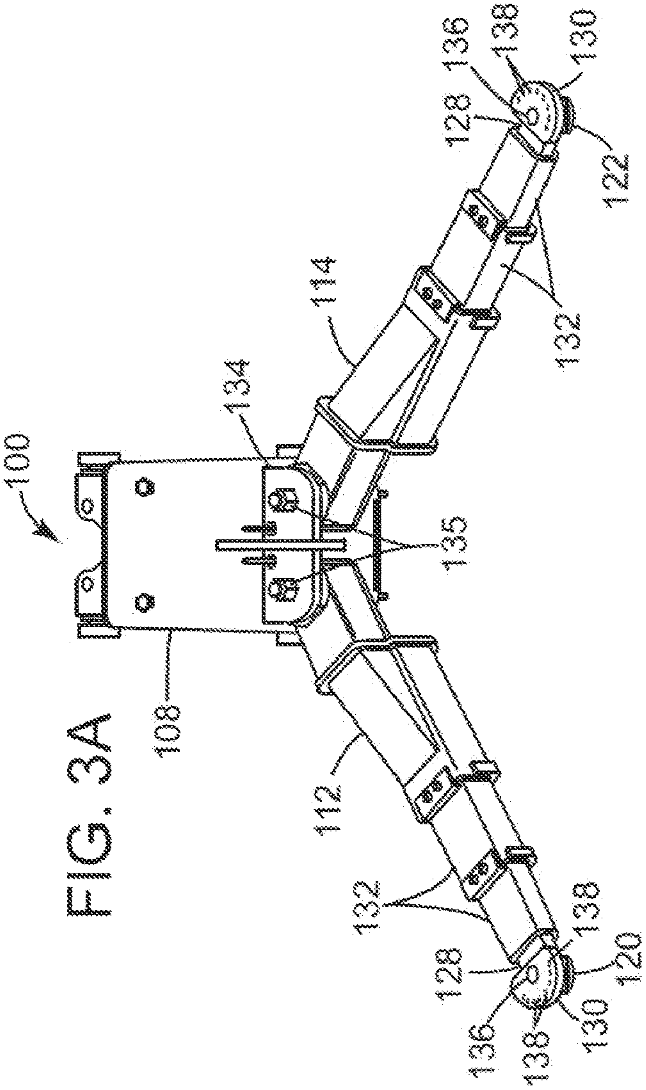
FIG. 3A depicts an example of a perspective view of the lower portion of the two-post vehicle lift system of FIG. 2 according to aspects disclosed herein.
Figure 3C:
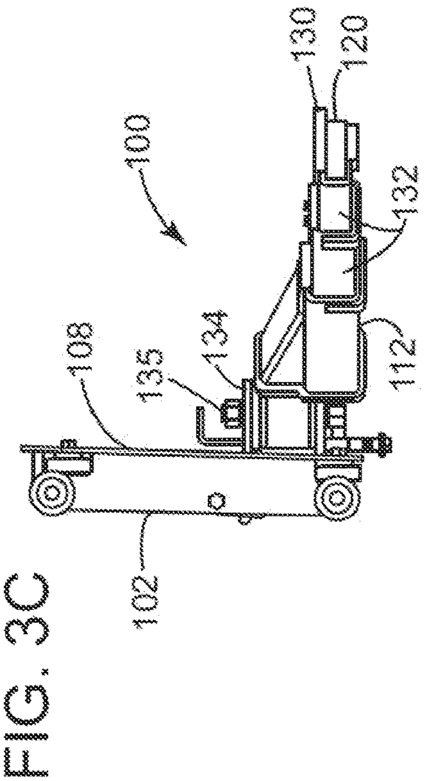
FIG. 3C depicts an example of a side view of the lower portion of the two-post vehicle lift system of FIG. 2 according to aspects disclosed herein.

Referring to FIGS. 3A, B and C, an example of a perspective view (FIG. 3A), a top view (FIG. 3B) and a side view (FIG. 3C) of the lower portion of the two-post vehicle lift system 100 of FIG. 2 is depicted according to aspects disclosed herein.

Each swing arm platform 120, 122, 124, 126 includes an elongated base portion 128 and a head portion 130. The base portion is telescopically engageable with a swing arm 112, 114, 116, 118.

At least one slide arm 132 is disposed between each swing arm platform 120, 122 and its respective swing arm 112, 114. In the specific case of FIGS. 3A, 3B and 3C, there are up to two slide arms 132 disposed between each swing arm platform and its respective swing arm.

The slide arms 132 complete an indirect telescopic connection between the swing arm platforms 120, 122 and the swing arms 112, 114. The slide arms 132 are operable to position its associated swing arm platform radially with respect to its associated swing arm. Additionally, one skilled in the art would recognize that the swing arm platforms 120, 122 may be connected directly to the swing arms 112, 114 and positioned radially without any slide arms 132 disposed in between.

Each swing arm 112, 114 is pivotally connected (with, in this case, carriage bolts 135) to a carriage moon 134. The pivotal connection enables the swing arms 112, 114 to swing in a plane of motion that is substantially perpendicular to the carriage 108.

The head portion 130 of each swing arm platforms 120, 122 is integrally and rigidly connected to the base portion 128. The head portion includes an attachment pin hole 136 sized to receive an adapter attachment pin (best seen in FIG. 7) to pivotally secure an adapter to the swing arm platform 120, 122.

A plurality of locking pin holes 138 are disposed around the periphery of the head portion 130. The locking pin holes 138 are sized to receive an adapter locking pin (best seen in FIG. 7) to lock the adapter into a fixed position relative to the swing arm platform 120, 122.

Referring to FIGS. 4, an example of a perspective view of a low profile adapter 140 is depicted according to aspects disclosed herein. The low profile adapter 140 is removably engageable (best seen in FIG. 7) with the two-post vehicle lift system 100. The low profile adapter 140 has a low enough profile to fit into low clearance spaces between bottom portions of material handling vehicles (such as vehicle 10) and a floor in order to enable the two-post vehicle lift system 100 to engage and lift the material handling vehicles. For example, the low profile adapters may engage with the frame, or the outrigger arms, of a forklift truck, a pallet jack or other types of material handling vehicles.

The low profile adapter 140 includes a support member 142, a base plate 144 and at least one capture plate 146. The base plate 144 is rigidly connected to a bottom portion of the support member 142. The base plate 144 extends longitudinally from a first side 148 of the support member 142. In this case, the base plate 144 extends substantially perpendicularly from the first side 148 of the support member 142.

The capture plate 146 is rigidly connected to the support member 142 and extends longitudinally from an opposing second side 150 of the support member 142. The capture plate 146 is operable to pivotally engage with at least one swing arm platform 120 (best seen in FIG. 6) of the vehicle lift system 100.

In the particular example illustrated in FIG. 4, the at least one capture plate 146 of the low profile adapter 140 includes a top capture plate 146A and a bottom capture plate 146B. The top capture plate 146A has a first adapter attachment pin hole 152A and the bottom capture plate 146B has a second adapter attachment pin hole 152B. The first and second adapter attachment pin holes 152A, 152B are positioned to align with the attachment pin hole 136 of at least one swing arm platform 120, 122, 124, 126. The first and second adapter attachment pin holes 152A, 152B and the attachment pin hole 136 of a swing arm platform 120, 122, 124,

126 are all sized to receive an adapter attachment pin 164 (best seen in FIG. 7) to pivotally connect the low profile adapter 140 to the swing arm platform.

The top capture plate 146A also has one or more adapter locking pin holes 153. The adapter locking pin holes 153 are positioned to align with at least one of the locking pin holes 138 of a swing arm platform 120, 122, 124, 126 when the low profile adapter 140 is pivotally attached to the swing arm platform by the attachment pin 164. The adapter locking pin holes 153 and locking pin holes 138 of the swing arm adapter are all sized to receive an adapter locking pin 166 (best seen in FIG. 7) to lock the low profile adapter 140 into a fixed position relative to the swing arm platform.

The low profile adapter 140 also includes a height adjustment mechanism 154. The height adjustment mechanism 154 includes one or more protrusions 154A, 154B, 154C disposed around a perimeter of the base plate 144. The protrusions 154A, 154B, 154C are spaced to receive one or more spacer blocks 156A, 156B. The spacer blocks 156A, 156B are operable to engage and raise a vehicle a predetermined height 158 above a top surface 160 of the base plate 144.

In the example illustrated in FIG. 4, there is a first spacer block 156A and a second spacer block 156B. However, one skilled in the art would recognize that any number of spacer blocks 156 may be stacked to attain the desired predetermined height 158.

Figure 5:
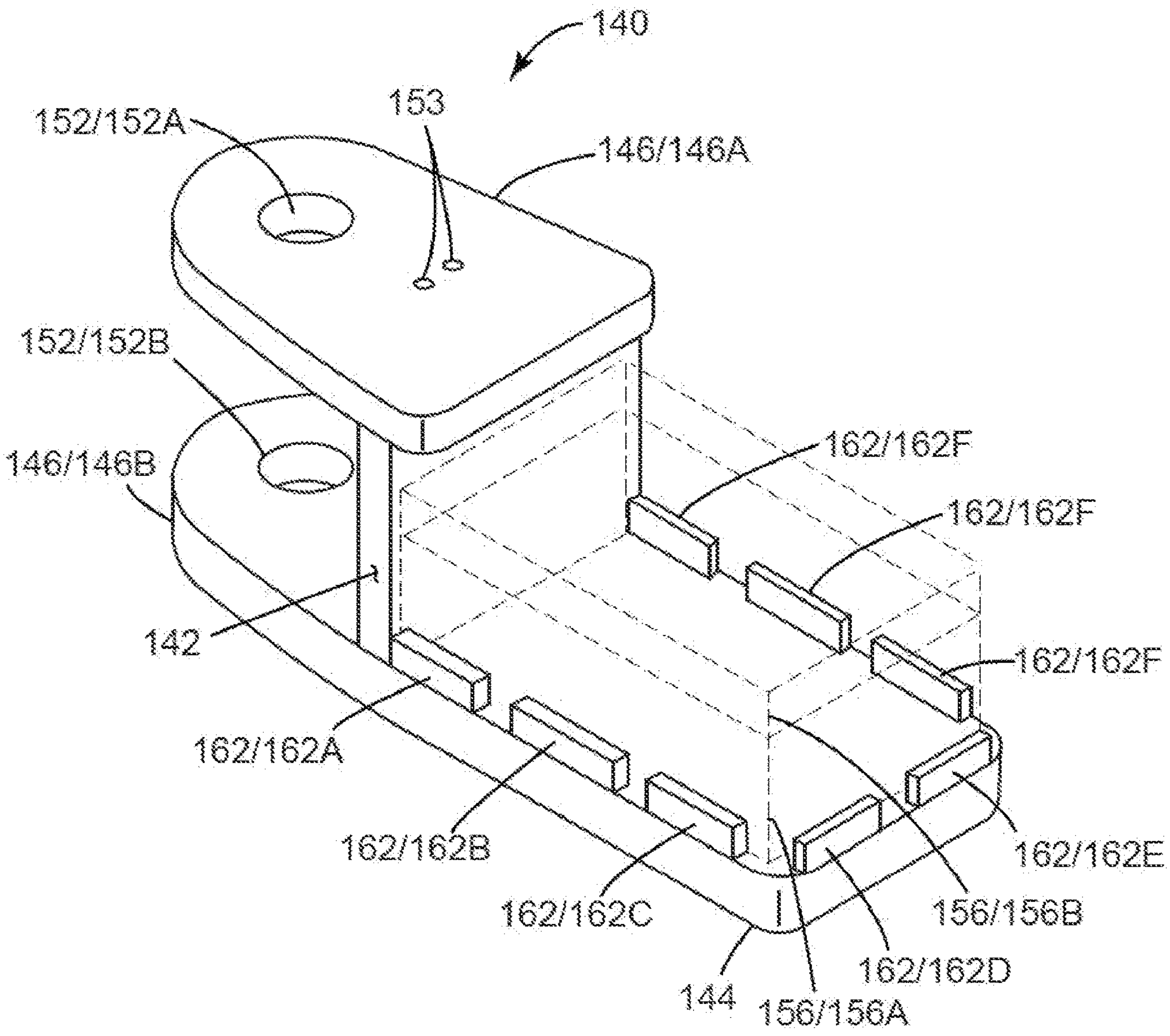
FIG. 5 depicts an example of a perspective view of a low profile adapter with an alternative height adjustment mechanism according to aspects disclosed herein.

Referring to FIG. 5, an example of a perspective view of a low profile adapter 140 with an alternative height adjustment mechanism 162 is depicted according to aspects disclosed herein. All other features of the low profile adapter 140 of FIG. 5 are the same as the low profile adapter of FIG. 4.

The alternative locking mechanism 162 of FIG. 5 includes a plurality of shorter protrusions 162A, B, C, D, E, F, G and H (herein 162A-H). The protrusions 162 A-H are spaced to receive one or more spacer blocks 156A, 156B. The spacer blocks 156A, 156B are operable to engage and raise a vehicle a predetermined height 158 above a top surface 160 of the base plate 144.

Though FIGS. 4 and 5 illustrate the height adjustment mechanism as a plurality of protrusions, one skilled in the art would recognize that other variations and/or types of height adjustment mechanisms may be attached to the low profile adapters 140. For example, the height adjustment mechanism may be a single protrusion (not shown) wrapping around the periphery of the base plate 144. Alternatively, by way of example, the height adjustment mechanism may include a screw system (not shown) attached to the base plate 144 that can be used to raise or lower a spacer block 156.

Figure 6:
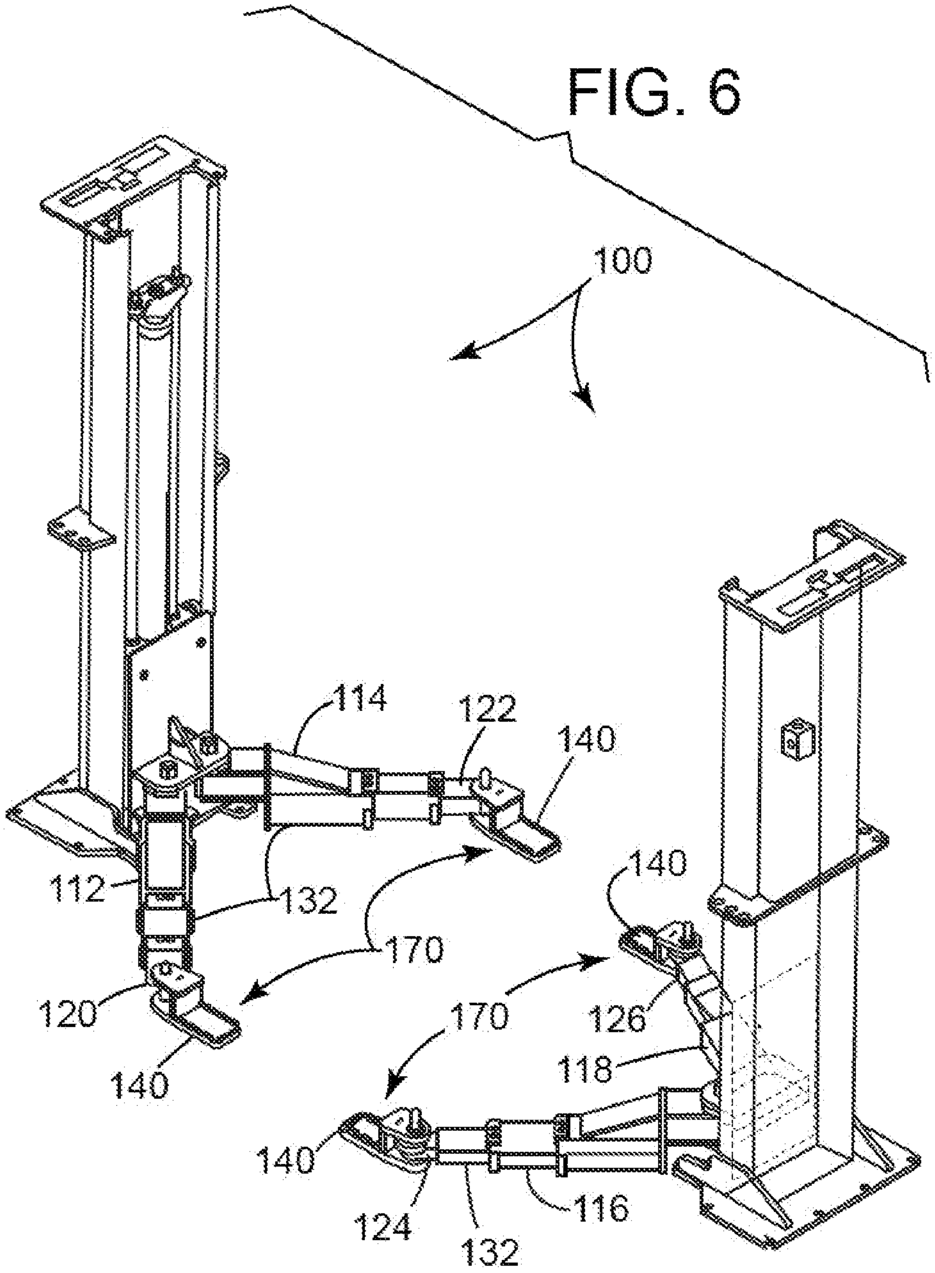
FIG. 6 depicts an example of a perspective view of the two-post vehicle lift system engaged with an embodiment of an adapter system according to aspects disclosed herein.

Referring to FIG. 6, an example of a perspective view of the two-post vehicle lift system 100 engaged with an embodiment of adapter system 170 is depicted according to aspects disclosed herein. In this specific case, the adapter system 170 includes a low profile adapter 140 engaged with each swing arm platform 120, 122, 124, 126.

Figure 7:
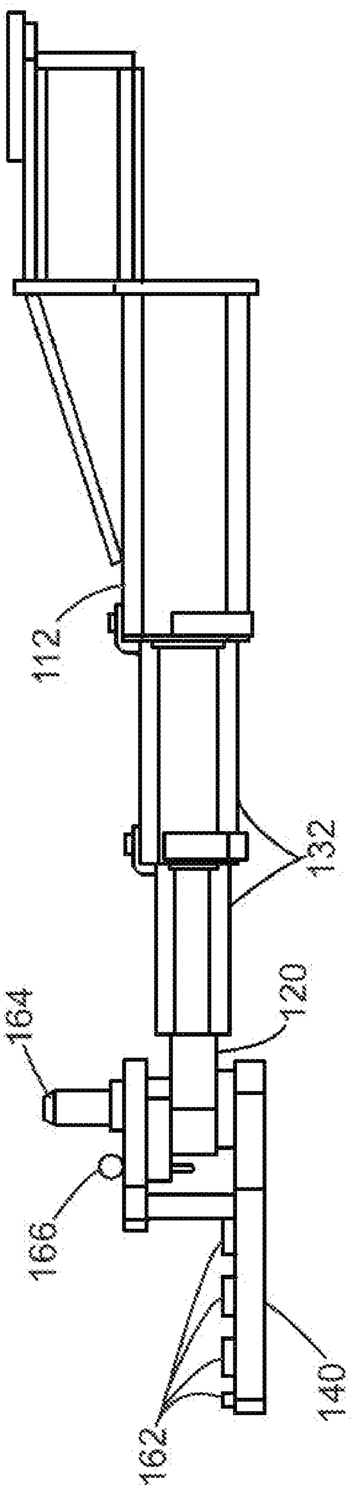
FIG. 7 depicts an example of an enlarged side view of a swing arm, swing arm platform and low profile adapter of FIG. 6 according to aspects described herein.

Referring to FIG. 7, an example of an enlarged side view of a swing arm 112, one or more slide arms 132, swing arm platform 120 and low profile adapter 140 of FIG. 6 is depicted according to aspects described herein. In this case, the swing arm 112 is telescopically connected to the swing arm platform 120 via one or more slide arms 132.

The low profile adapter 140 is pivotally attached to the swing arm platform via an adapter attachment pin 164. The attachment pin 164 slidably fits through the first and second adapter attachment pin holes 152A, 152B of the low profile adapter 140 (best seen in FIG. 5) and the attachment pin hole 136 of the swing arm platform 120 (best seen in FIG. 3B).

The low profile adapter 140 is locked in place relative to the swing arm platform 120 via an adapter locking pin 166. The locking pin 166 slidably fits through one of the adapter locking pin holes 153 of the low profile adapter 140 (best seen in FIG. 5) and one of the locking pin holes 138 of the swing arm platform 120 (best seen in FIG. 3B).

Figure 8:
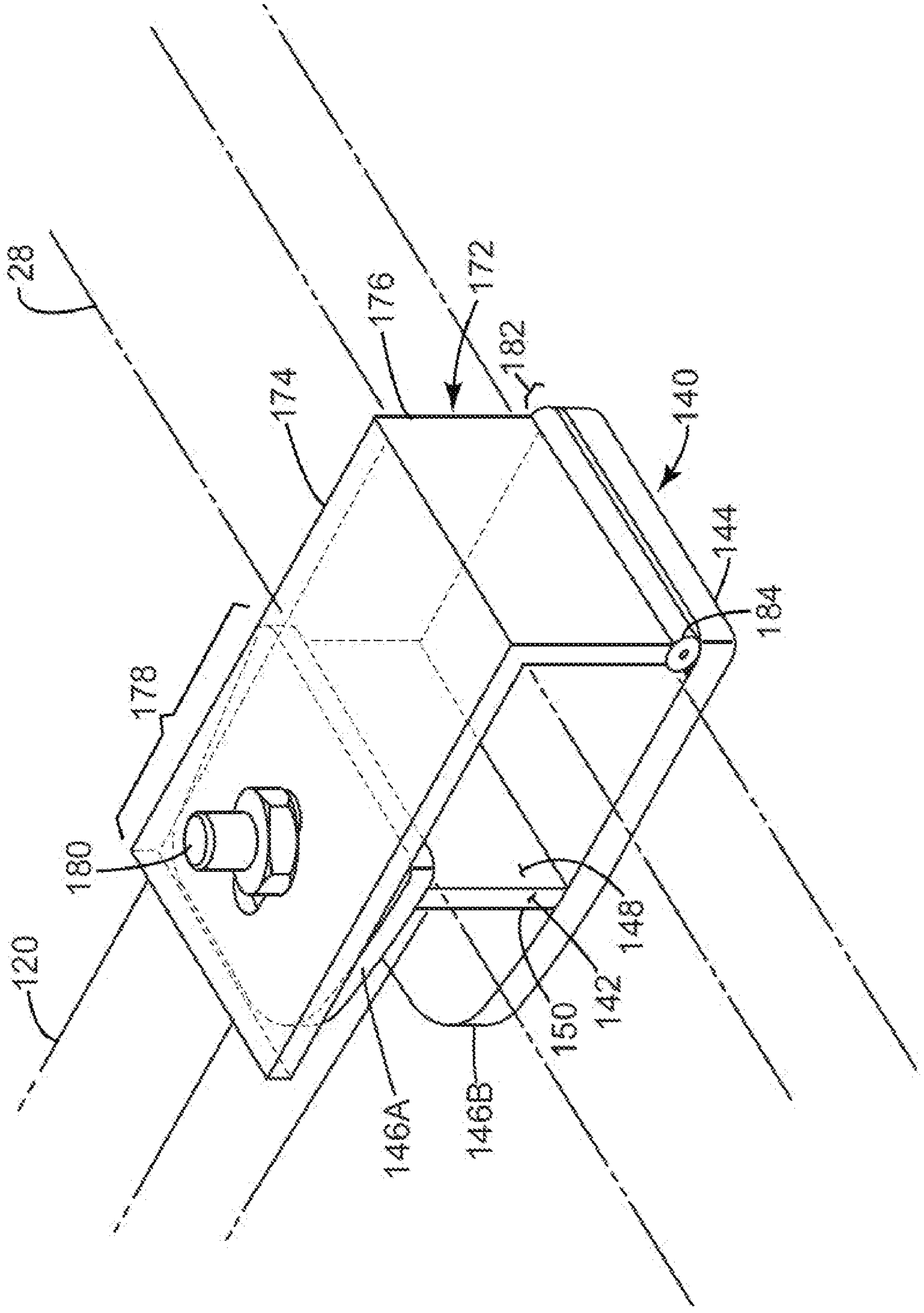
FIG. 8 depicts an example of a perspective view of a low profile adapter having an outrigger arm capture mechanism according to aspects disclosed herein.

Referring to FIG. 8, an example of a perspective view of a low profile adapter 140 having an outrigger arm capture mechanism 172 is depicted according to aspects disclosed herein. The low profile adapter 140 includes a support member 142, a base plate 144 and at least one capture plate 146. The base plate 144 is rigidly connected to a bottom portion of the support member 142. The base plate 144 extends longitudinally from a first side 148 of the support member 142.

The at least one capture plate 146 is rigidly connected to the support member 142 and extends longitudinally from an opposing second side 150 of the support member 142. The capture plate 146 is operable to pivotally engage with at least one swing arm platform 120 of the vehicle lift system 100. In the particular example illustrated in FIG. 8, the at least one capture plate 146 of the low profile adapter 140 includes a top capture plate 146A and a bottom capture plate 146B.

In this particular case, the outrigger arm capture mechanism 172 is configured as an outrigger arm capture member 172. The outrigger arm capture member 172 includes a first leg 174 and a second leg 176 that are connected together at a substantially right angle in the form of an L-shaped bracket.

The first leg 174 has a distal end portion 178 that is connected to one of an upper portion of the support member 142 and the at least one capture plate 146. In other words, the distal end portion 178 may be connected to either the upper portion of the support member 142 or the at least one capture plate 146. In this particular example, the distal end portion 178 is removably connected to the top capture plate 146A by an attachment bolt 180.

The second leg 176 has a distal end portion 182 that is connected to the base plate 144. In this particular example, the distal end portion 182 of the second leg 176 is pivotally connected to the base plate 144 by a hinge 184.

The outrigger arm capture member 172, the support member 142 and the base plate 144 form a drive-thru slot that is sized to slidably receive and capture an outrigger arm 28 of the material handling vehicle 10. The drive-thru slot may be sized to receive and capture any type of outrigger arm 28. For example, the outrigger arm 28 may be an outrigger arm of a forklift truck or a pallet arm of a pallet jack. The drive-thru slot may also be utilized to capture other structures on a material handling vehicle, such as the forks or parts of the frame of the material handling vehicle. During operation, the outrigger arm capture member can be bolted shut to hold the outrigger arm 28.

Though this example illustrates the distal end portion 178 removably bolted to the top capture plate 146A and the distal end portion 182 pivotally connected to the base plate 144, several other configurations and types of connections may be made. For example, both distal end portions 178 and 182 may be rigidly connected to the low profile adapter via welding. Moreover, the distal end portion 172 may be removably connected to the base plate 144 and the distal end portion 178 may be pivotally connected to the top capture plate 146A.

Figure 9:
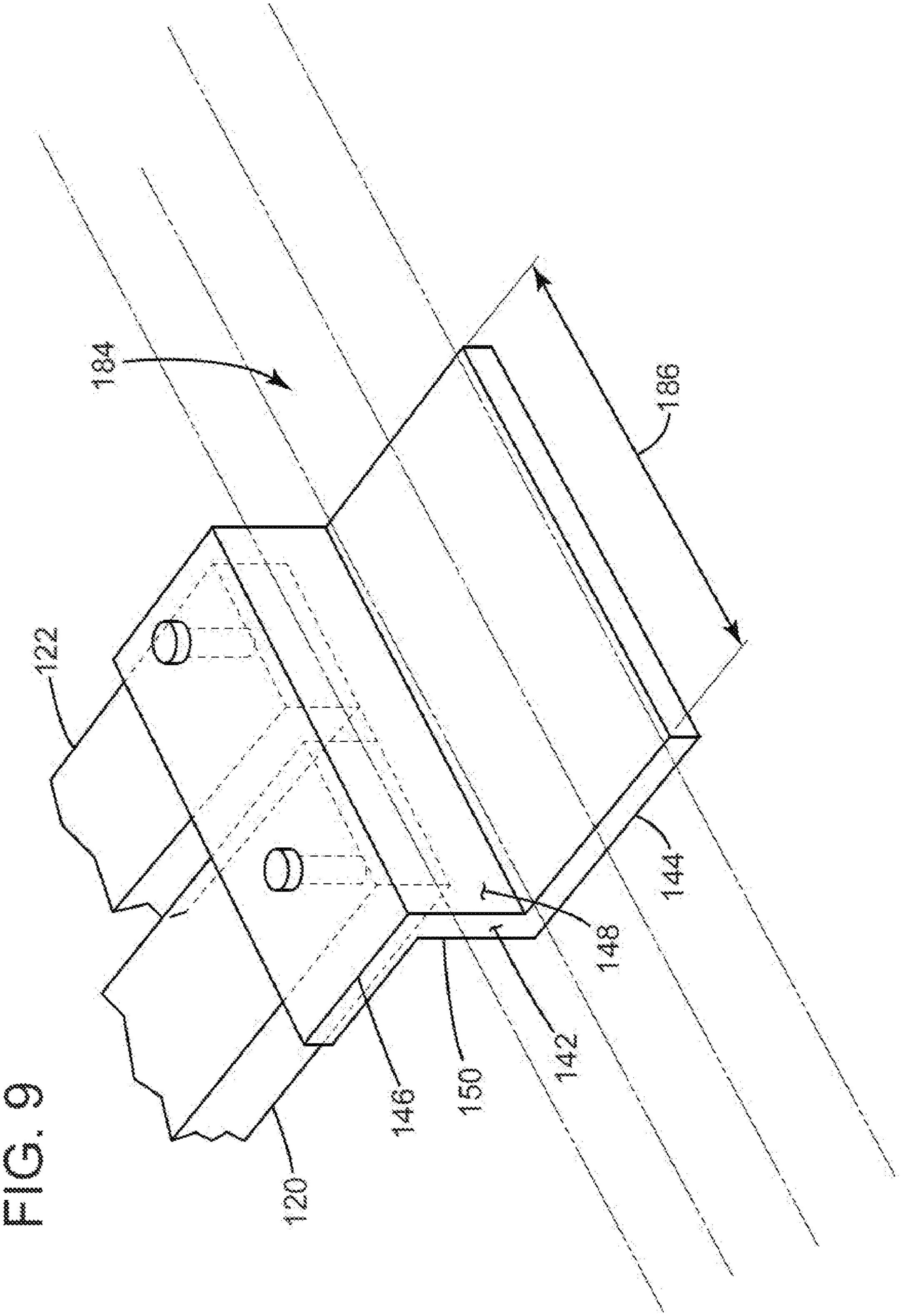
FIG. 9 depicts an example of a perspective view of an alternative embodiment low profile adapter according to aspects disclosed herein.

Referring to FIG. 9, an example of a perspective view of an alternative embodiment low profile adapter 184 is depicted according to aspects disclosed herein. The alternative embodiment low profile adapter 184, has many of the same features as the low profile adapter 140 except that it has a width 186 that is sized to receive a pair of swing arm platforms 120, 122.

Accordingly, the low profile adapter 184 includes a support member 142, a base plate 144 and at least one capture plate 146. The base plate 144 is rigidly connected to a bottom portion of the support member 142. The base plate 144 extends longitudinally from a first side 148 of the support member 142. The at least one capture plate 146 is rigidly connected to the support member 142 and extends longitudinally from an opposing second side 150 of the support member 142. The base plate 144 of the low profile adapter 184, may also include a height adjustment mechanism, such as the protrusions 154 and 162 as illustrated in FIGS. 4 and 5 respectively.

Referring to FIG. 10, an example of a perspective view of an extended profile adapter 188 configured as an outrigger adapter 190 is depicted according to aspects described herein. The extended profile adapter 188 is removably engageable with a swing arm platform 120 of a first post 102 and a swing arm platform 124 of a second post 104 of the two-post vehicle lift system 100. The extended profile adapter 188 may be included in the adapter system 170 (best seen in FIG. 15) that is engageable with the two-post vehicle lift system 100.

The outrigger adapter 190 configuration of the extended profile adapter 188 includes an elongated top bar 192 that is removably engageable with the swing arm platform 120 of the first post 102 and the swing arm platform 124 of the second post 104. In the example illustrated in FIG. 10, the top bar 192 includes a pair of adapter attachment pins 194 disposed on opposing distal end portions of the top bar. The adapter attachment pins 194 extend downward from the top bar 192 and are sized to slidably fit into the attachment pin holes 136 of the swing arm platforms 120, 122, 124, 126.

The outrigger adapter 190 has an outrigger arm capture mechanism, which includes a pair of drive-thru slots 196 connected to the top bar 192. The drive-thru slots 196 are sized to slidably receive a pair of outrigger arms 28 of a material handling vehicle 10.

The outrigger arm capture mechanism of the outrigger adapter 190 also includes an elongated bottom plate 198 disposed below the top bar 192. A plurality of support beams 199 connect the top bar 192 to the bottom plate 198. The support beams 199 have a predetermined length 202 that spaces the top bar 192 and bottom plate 198 apart to form the pair of drive-thru slots 196.

Figure 11:
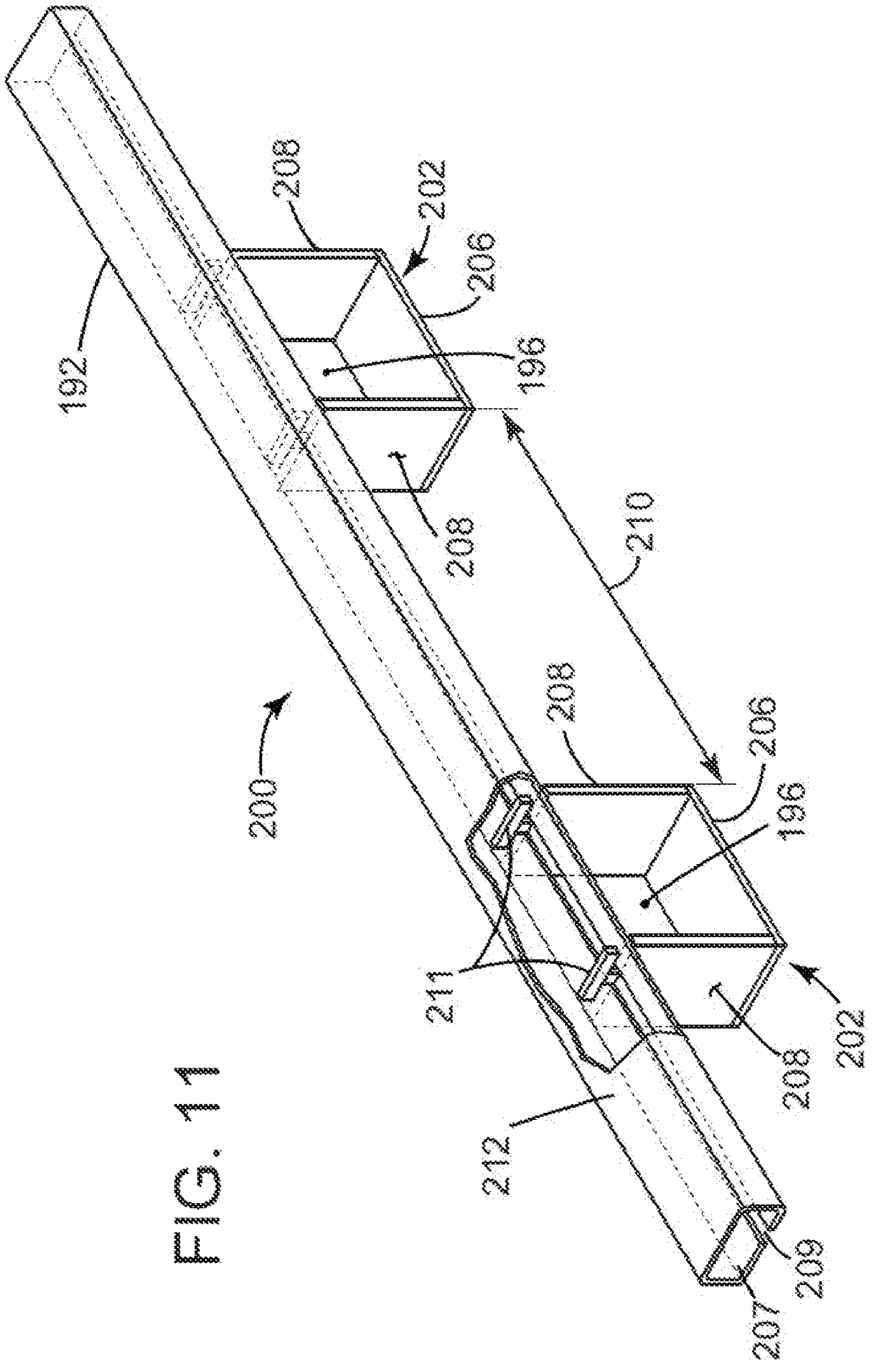
FIG. 11 depicts an example of a perspective view of an extended profile adapter configured as an alternative outrigger adapter according to aspects described herein.

Referring to FIG. 11, an example of a partially cut-away perspective view of an extended profile adapter 188 configured as an alternative outrigger adapter 200 is depicted according to aspects described herein. The outrigger arm capture mechanism illustrated in FIG. 11 includes a pair of metal rectangular frames 202 slidably connected to the top bar 192.

Each frame 202 has a bottom frame plate 206 that are rigidly connected by two side frame plates 208 to form the pair of drive-thru slots 196. Each frame 202 is adjustably connected to the top bar 192 such that a distance 210 between the frames 202 may be adjusted.

A pair of tee extensions 211 are disposed on the top distal ends of the bottom plates 208 of each frame 202. A channel 207 is disposed longitudinally within the top bar 192 and along the length of the top bar 192. A channel slot 209 is disposed along a bottom floor of the channel 207. The channel 207 and channel slot 209 are sized to receive the tee extensions 211 of the frames 202 and to enable the frames to be adjustably positioned along the length of the top bar 192 such that the distance 210 between the frames 202 may be adjusted.

Though the example illustrated in this FIG. 11 depicts each frame 202 being adjustably connected to the top bar 192 via a channel 207 and channel slot 209 disposed in the top bar 192 itself, several other suitable configurations of adjustable connections of the frames 202 to the top bar 192 may be utilized. For example, the frames may have a top plate (not shown) that includes the tee extensions 211. Also, the channel 209 may be a piece separate from the top bar 192, wherein the channel is bolted to the underside of the top bar.

Figure 12:
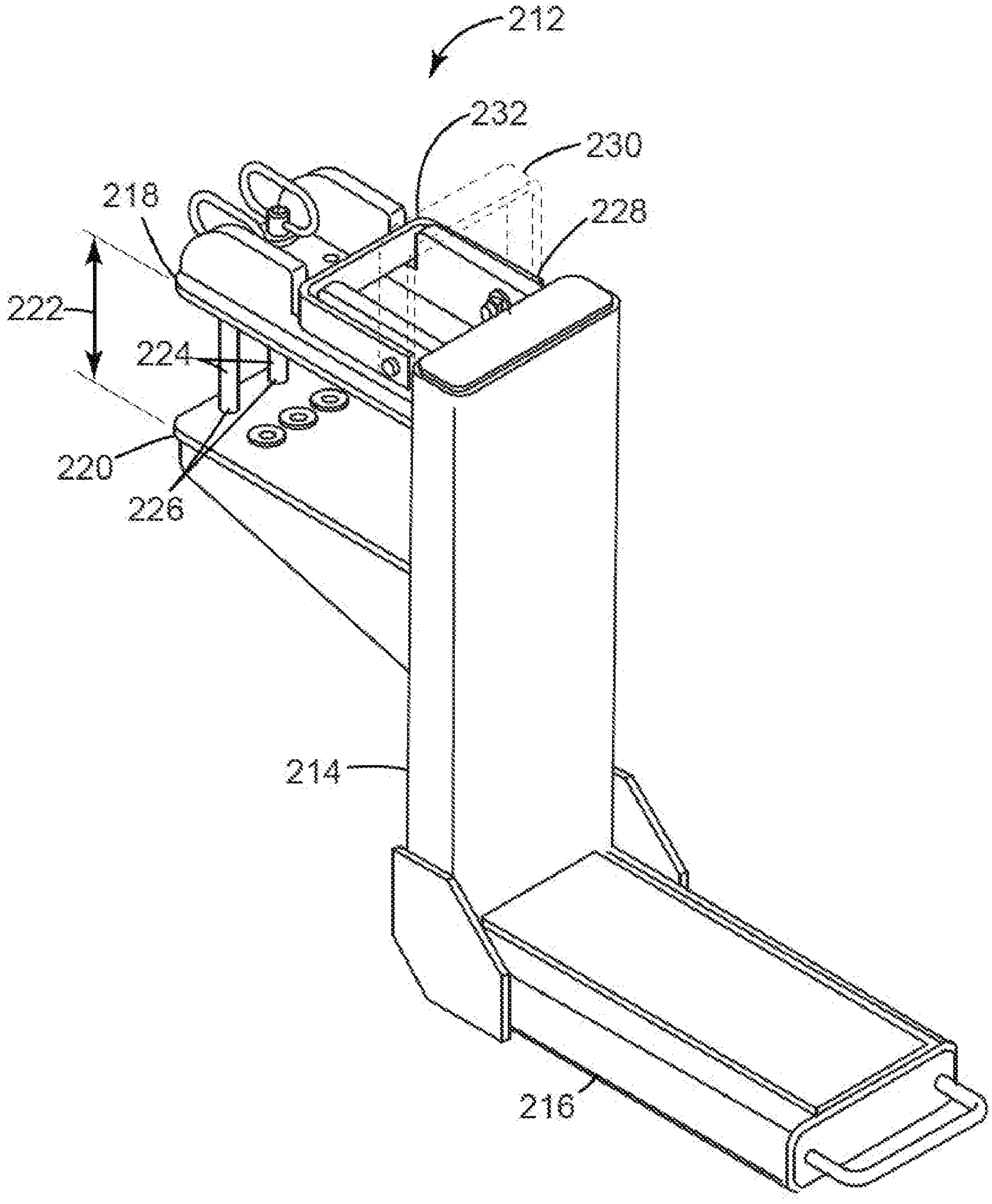
FIG. 12 depicts an example of a perspective view of a mast adapter according to aspects described herein.

Referring to FIG. 12, an example of a perspective view of a mast adapter 212 is depicted according to aspects described herein. The mast adapter 212 may be included in the adapter system 170 (best seen in FIG. 15) that is engageable with the two-post vehicle lift system 100.

The mast adapter 212 is removably engageable with the outrigger adapter 190. The mast adapter includes a support member 214, a bottom member 216, a top bar capture plate 218 and a bottom bar capture plate 220.

The bottom member 216 is rigidly connected at a substantially right angle to a bottom end portion of the support member 214. The bottom member 216 is operable to engage a mast 26 of the material handling vehicle 10.

The top and bottom bar capture plates 218, 220 are rigidly connected to an upper portion of the support member 214. The top and bottom bar capture plates 218, 220 are spaced apart a predetermined distance 222 to receive the top bar 192 of the outrigger adapter 190 (best seen in FIG. 13).

One or more mast adapter attachment pin holes 226 are disposed in the top capture plate 218. One or more mast adapter attachment pin holes 226 are disposed in the bottom capture plate 220 and are aligned with a corresponding mast adapter capture pin hole 226 in the top capture plate 218.

Mast adapter attachment pins 224 are sized to slidably extend through attachment pin holes 226 in the top and bottom capture plates 218, 220. The mast adapter attachment pins 224 are operable to secure the mast adapter 212 to the top bar 192 of the outrigger adapter 190.

A handle 228 is pivotally attached to the mast adapter 212 and can pivot from an open position 230 to a closed position 232. In the open position 230, the handle is operable to enable a user to carry the mast adapter therefrom. In the closed position 232, the mast adapter is flush against the top capture plate 218 to present a lower profile when the mast adapter is attached to the top bar 192 of the outrigger adapter 190.

Figure 13A:
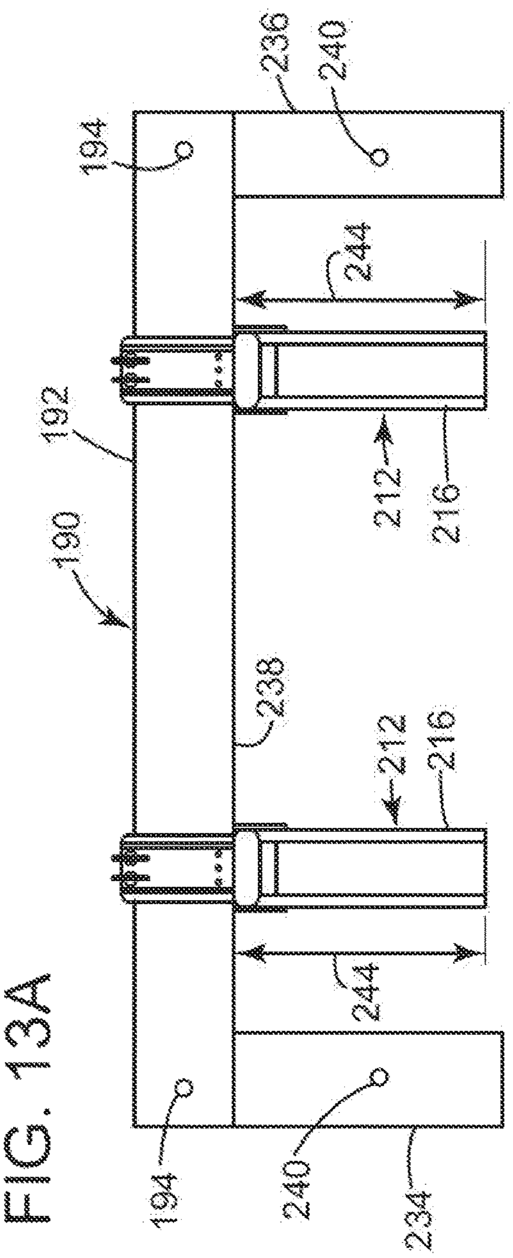
FIG. 13A depicts an example of a top view of an outrigger adapter with a pair of mast adapters mounted thereon according to aspects disclosed herein.
Figure 13C:
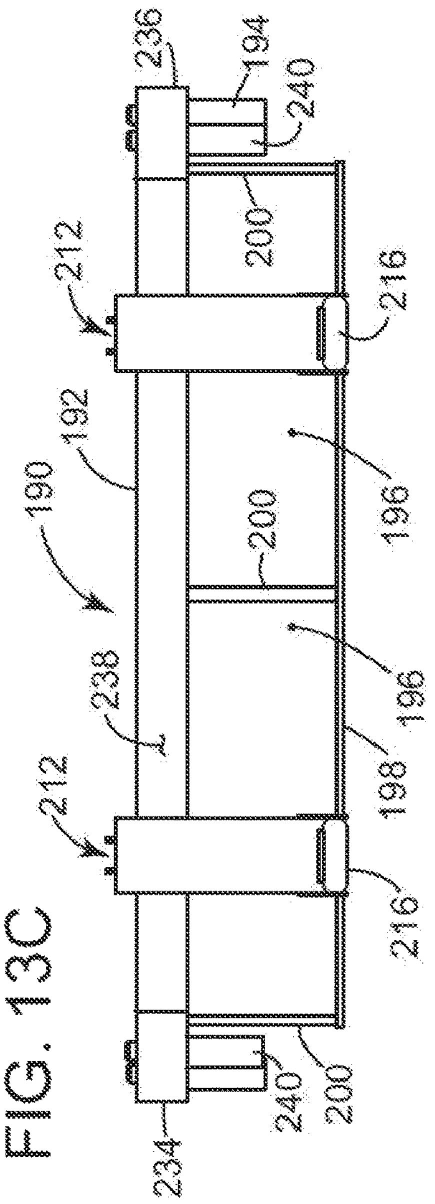
FIG. 13C depicts an example of a front view of an outrigger adapter with a pair of mast adapters mounted thereon according to aspects disclosed herein.
Figure 13B:
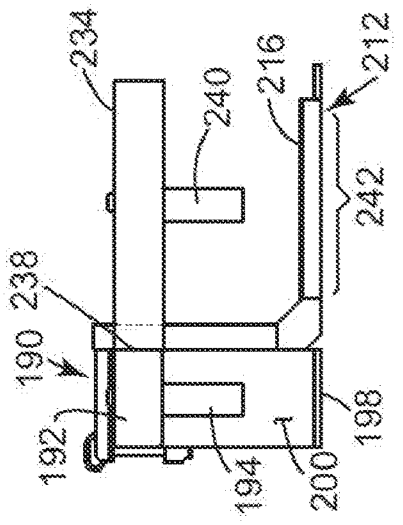
FIG. 13B depicts an example of a side view of an outrigger adapter with a pair of mast adapters mounted thereon according to aspects disclosed herein.

Referring to FIGS. 13A, 13B and 13C, an example of a top view (FIG. 13A), a side view (FIG. 13B) and a front view (FIG. 13C) of an outrigger adapter 190 with a pair of mast adapters 212 mounted thereon is depicted according to aspects disclosed herein. In the particular example of FIGS. 13A, 13B and 13C, the outrigger adapter includes all of the same structure as the outrigger adapter of FIG. 10 plus an additional first extension bar 234 and second extension bar 236. The first and second extension bars 234, 236 are rigidly connected to opposing distal ends of the top bar 192 of the outrigger adapter 190.

The first and second extension bars 234, 236 extend longitudinally, at substantially right angles, from a one side 238 of the top bar. The first extension bar 234 is engageable with the swing arm platform 122 of the first post 102 and the second extension bar 236 is engageable with the swing arm platform 126 of the second post 104 (best seen in FIG. 15).

More specifically in this particular example, the first and second bars 234, 236 are engageable with any of the swing arm platforms 120, 122, 124, 126 via extension bar attachment pins 240. Extension bar attachment pins 240 extend downward from the extension bars 234, 236 and are sized to slidably fit into the attachment pin holes 136 of any of the swing arm platforms 120, 122, 124, 126.

When the pair of mast adapters 212 are mounted on the outrigger adapter 190, the bottom members 216 of each mast adapter 212 extends longitudinally from the same one side 238 as that of the extension bars 234, 236. Accordingly, when the mast adapters 212 are mounted on the outrigger adapter 190, the extension bar attachment pins 240 substantially align with a middle portion 242 of the bottom member 216 of each of the mast adapters 212. For example, the extension bar attachment pins 240 may align with the middle two quarters of the overall length 244 of each of the bottom members 216. Also by way of example, the extension bar attachment pins 240 may align with the middle one third of the overall length 244 of each of the bottom members 216.

Without the extension bars 234, 236, a substantial torque is set up between the swing arm platforms 122, 126, that engage the attachment pins 194 disposed on the top bar 192, and the mast 26 of vehicle 10, that rests on the bottom member 216 of the mast adapters 212. With the extension bars 234, 236, this torque is greatly reduced due to the alignment of the attachment pins 240 with the middle portion 242 of the bottom member 216.

Figure 14A:
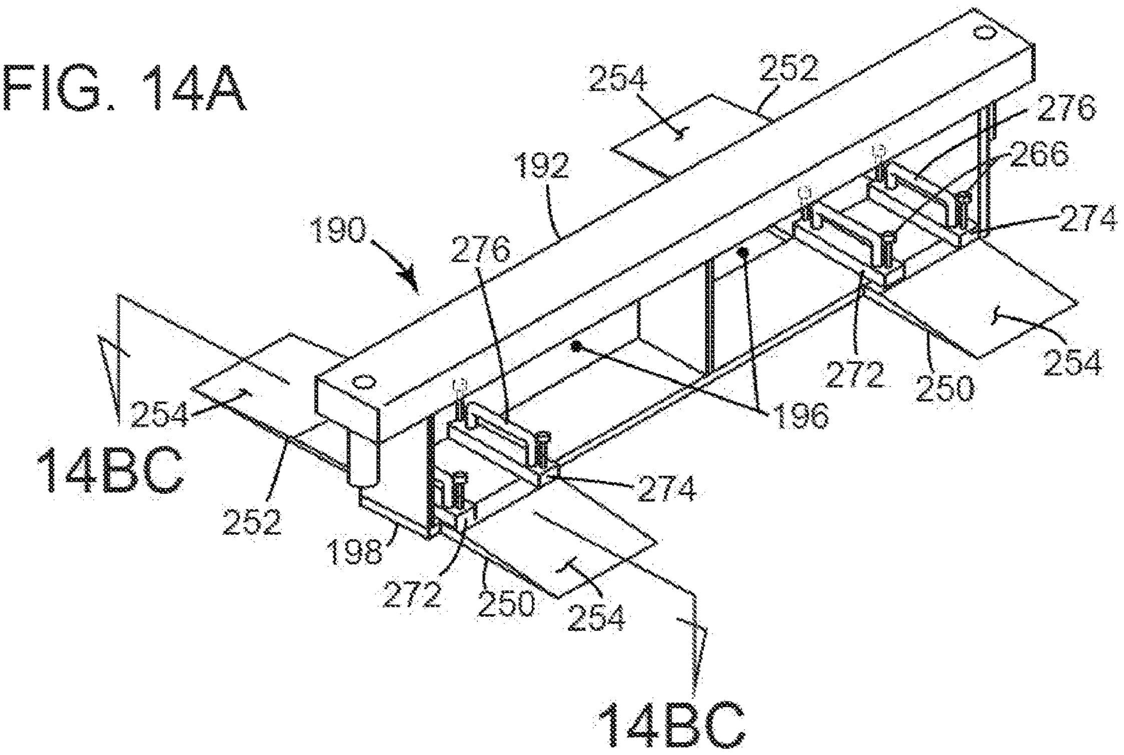
FIG. 14A depicts an example of a perspective view of an outrigger adapter having a pair of outrigger ramp systems disposed thereon according to aspects disclosed herein.
Figure 14B:
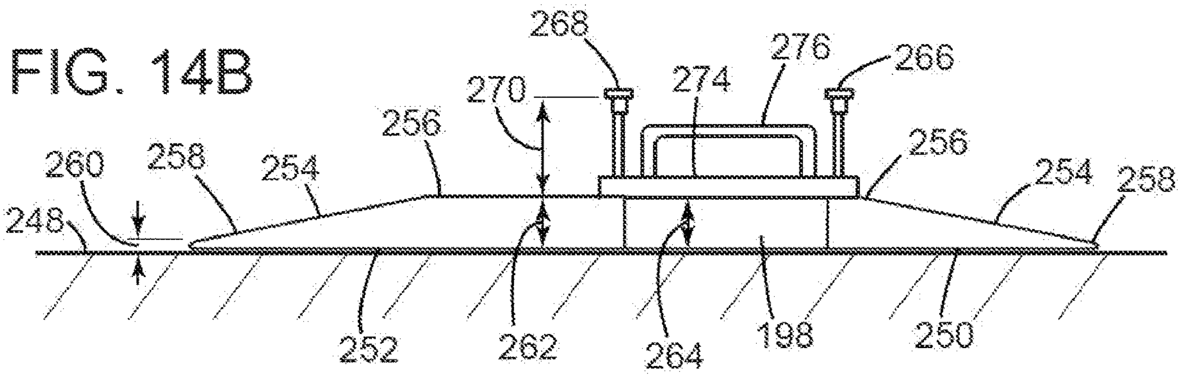
FIG. 14B depicts an example of a cross sectional side view of FIG. 14A taken along the line 14BC-14BC when the outrigger adapter and outrigger ramp system are not raised off of a floor by the two-post vehicle lift system according to aspects disclosed herein.
Figure 14C:
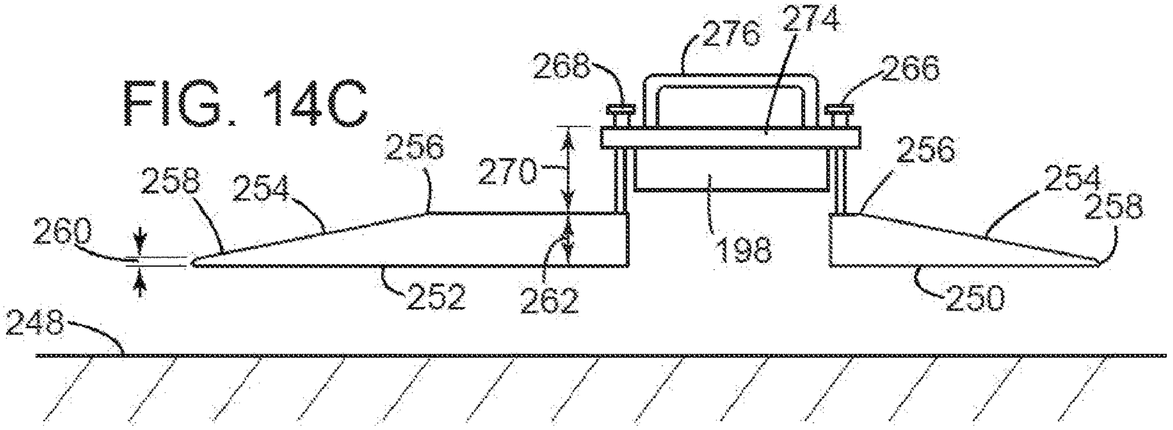
FIG. 14C depicts an example of a cross sectional side of FIG. 14A taken along the line 14BC-14BC when the outrigger adapter and outrigger ramp system are raised off of the floor by the two-post vehicle lift system according to aspects disclosed herein.

Referring to FIGS. 14A, 14B and 14C, wherein:

FIG. 14A is an example of a perspective view of an outrigger adapter 190 having a pair of outrigger ramp systems 246 disposed thereon according to aspects disclosed herein;

FIG. 14B is an example of a cross sectional side view of FIG. 14A taken along the line 14BC-14BC when the outrigger adapter 190 and outrigger ramp systems 246 are not raised off of a floor 248 by the two-post vehicle lift system 100 according to aspects disclosed herein; and FIG. 14C is an example of a cross sectional side of FIG. 14A taken along the line 14BC-14BC when the outrigger adapter 190 and outrigger ramp systems are raised off of the floor 248 by the two-post vehicle lift system 100 according to aspects disclosed herein.

In the particular example of FIGS. 14A, 14B and 14C, the outrigger adapter 190 includes all of the same structure as the outrigger adapter 190 of FIG. 10. The outrigger adapter 190 and outrigger ramp systems 246 may be included in the adapter system 170 (best seen in FIG. 15) that is engageable with the two-post vehicle lift system 100.

The pair of outrigger ramp systems 246 are removably engageable with the bottom plate 198 of the outrigger adapter 190. Each outrigger ramp system 246 includes an approach ramp 250 and a down ramp 252, each ramp 250, 252 has an inclines surface 254, which extends from an upper level end 256 to a lower level end 258.

The lower level end has a height 260 sized to allow an outrigger arm 28 of a material handling vehicle 10 to drive over. For example, the height 260 may be substantially one half inch or less, or may be one quarter inch or less, or may be one eighth inch or less.

The upper level end 256 has a height 262 substantially equal to a thickness 264 of the bottom plate 198 of the outrigger adapter 190. For example, the height 262 may be within one half or less of the thickness 264, or may be within one quarter inch or less of the thickness 264, or may be within one eighth inch or less of the thickness 264.

A pair of first ramp pins 266 are rigidly attached to the upper level end 256 of the approach ramp 250 and a pair of second ramp pins 268 are rigidly attached to the upper level end 256 of the down ramp 252. Each pair of ramp pins 266, 268 are positioned on opposing sides of the upper level end 256 of each ramp 250, 252. The ramp pins 266, 268 extend upwards for a predetermined height 270.

A first ramp placer bar 272 is slidably connected between the first ramp pin 266 on one side of the approach ramp 250 and the second ramp pin 268 on one side of the down ramp 252. A second ramp placer bar 274 is slidably connected between the first ramp pin 266 on the opposing side of the approach ramp 250 and the second ramp pin 268 on the opposing side of the down ramp 252.

The approach ramp 250 and the down ramp 252 are spaced apart by the first and second ramp placer bars 272, 274 such that they are operable to straddle the bottom plate 198 of the outrigger adapter 190 to allow an outrigger arm 28 to drive up the approach ramp 250, over the bottom plate 198 and down the down ramp 252.

During operation and prior to when the two-post lift system 100 lifts the outrigger adapter 190 off of the floor 248, the bottom plate 198, approach ramp 250 and down ramp 252 are all flush with the floor 248 (best seen in FIG. 14B). This enables an outrigger arm 28 to drive onto and over the bottom plate 198.

When the outrigger adapter 190 is lifted by the two-post lift system 100, the bottom plate 198 will urge the two ramp placer bars 272, 274 upward along the length 270 of the pins 266, 268 until they contact heads of the pins 266, 268. Once the placer bars 272, 274 contact the heads of the pins 266, 268, the bottom plate 198 will lift the ramps 250, 252 off of the floor 248 as well (best seen in FIG. 14C).

A handle 276 is disposed on both placer bars 272, 274. The handle is operable to enable a user to carry the outrigger ramp systems 246.

Figure 15:
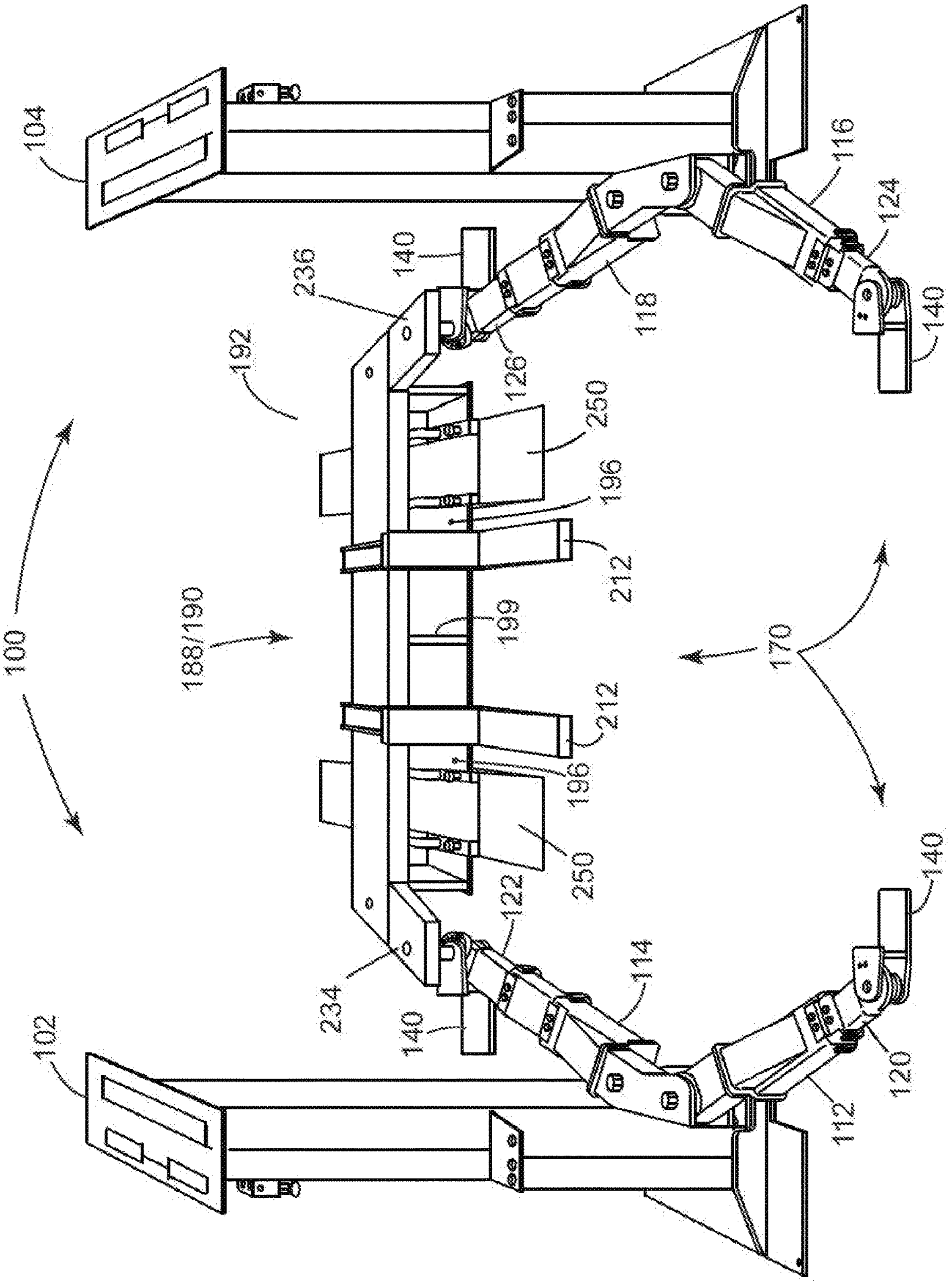
FIG. 15 depicts an example of a perspective view of the two-post vehicle lift system engaged with another embodiment of the adapter system according to aspects disclosed herein.

Referring to FIG. 15, an example of a perspective view of the two-post vehicle lift system 100 engaged with another embodiment of the adapter system 170 is depicted according to aspects disclosed herein. The vehicle lift system includes the first and second posts 102, 104. The first post 102 includes swing arms 112, 114 connected to swing arm platforms 120, 122 respectively. The second post 104 includes swing arms 116, 118 connected to swing arm platforms 124, 126 respectively.

The adapter system 170 includes low profile adapters 140 connected to each swing arm platform 120, 122, 124, 126. An extended profile adapter 188 configured as an outrigger adapter 190 with extension bars 234, 236 is connected to swing arm platform 122 of the first post 102, and swing arm platform 126 of the second post 104. The adapter system 170 also includes a pair of mast adapters 212 and a pair of outrigger ramp systems 246 mounted on the outrigger adapter 190.

During operation, outrigger arms 28 of a material handling vehicle 10 may be driven over ramp systems 246 and into drive-thru slots 196. The forks 20 of the vehicle 10 will be positioned above the top bar 192 of the outrigger adapter 190.

When the vehicle lift system 100 lifts the adapter system 170, the drive-thru slots 196 will secure the outrigger arms 28 of vehicle 10. Additionally, the mast adapters 212 will engage and lift the mast 26 of the vehicle 10. Further, the low profile adapters 140, attached to swing arm platforms 120 of the first post 102 and 124 of the second post 104, will engage and lift the rear of the vehicle 10. Also, as an added safety feature, the top bar 192 will provide a positive stop for the forks 20 to prevent them from inadvertently falling if power to the forks is removed during a maintenance operation.

Figure 16:
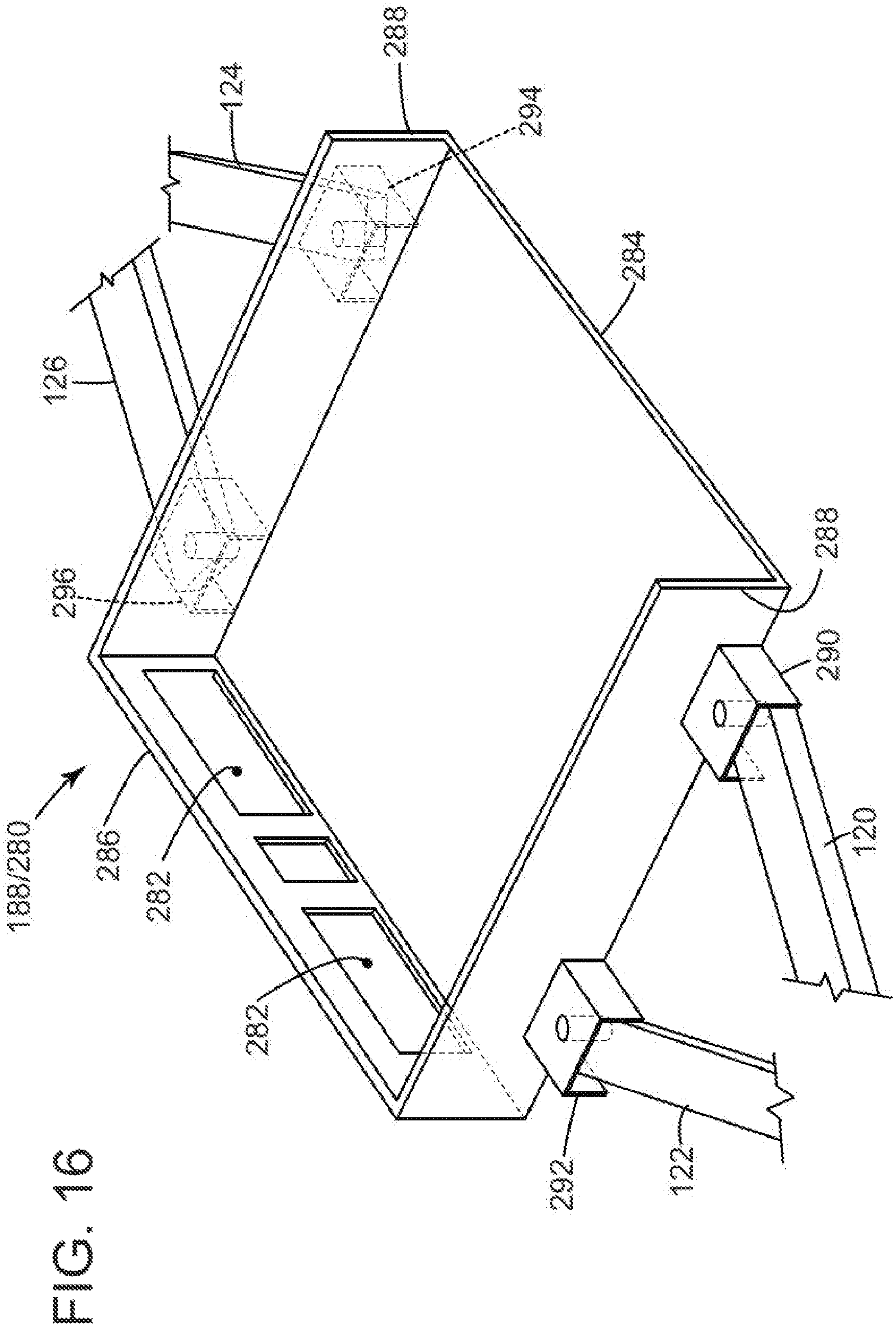
FIG. 16 depicts an example of a perspective view of the extended profile adapter configured as a flat jack adapter according to aspects disclosed herein.

Referring to FIG. 16, an example of a perspective view of the extended profile adapter 188 configured as a flat jack adapter 280 is depicted according to aspects disclosed herein. The flat jack adapter 280 may be included in the adapter system 170 that is engageable with the two-post vehicle lift system 100. The flat jack adapter 280 is configured to receive the outrigger arms 28 of the material handling vehicle 10 in an outrigger arm capture mechanism 282 and to support the weight of the vehicle 10 driven thereon.

The flat jack adapter 280 includes a base plate 284, a front wall 286, and a pair of side walls 288. The base plate 284 is sized to receive the vehicle 10 driven thereon.

The front wall 286 connected to a front end of the base plate 284 and extends upward therefrom. The front wall 286 includes the outrigger arm capture mechanism 282 configured as a pair of drive-thru slots 282 sized to slidably receive a pair of outrigger arms 28 of the vehicle 10.

The pair of side walls 288 extend upwards from opposing side ends of the base plate 284. First and second arm connectors 290, 292 are rigidly disposed on one of the side walls 288. Third and fourth arm connectors 294, 296 are rigidly disposed on the other side wall 288. The first and second arm connectors 290, 292 are engageable with a pair of swing arm platforms 120, 122 of the first post 102 of the two-post vehicle lift system 100. The third and a fourth arm connectors 294, 296 are engageable with a pair of swim arm platforms 124, 126 of the second post 104 of the two-post vehicle lift system 100.

Figure 17A:
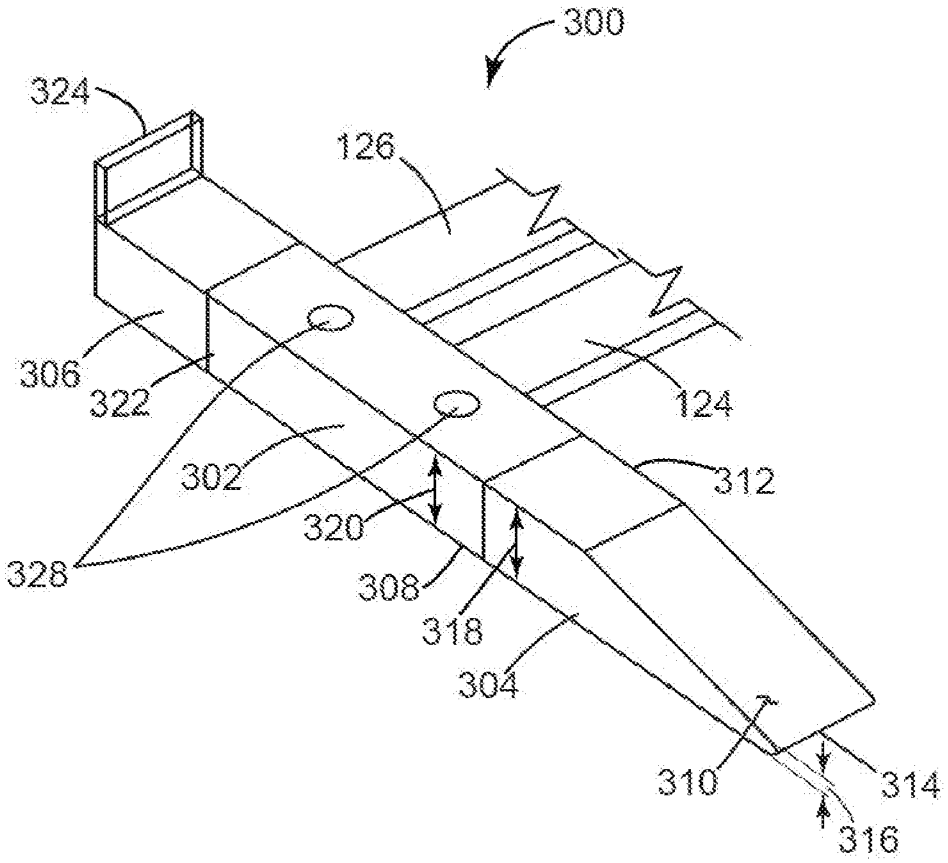
FIG. 17A depicts an example of a perspective view of a drive-on adapter according to aspects disclosed herein.
Figure 17B:
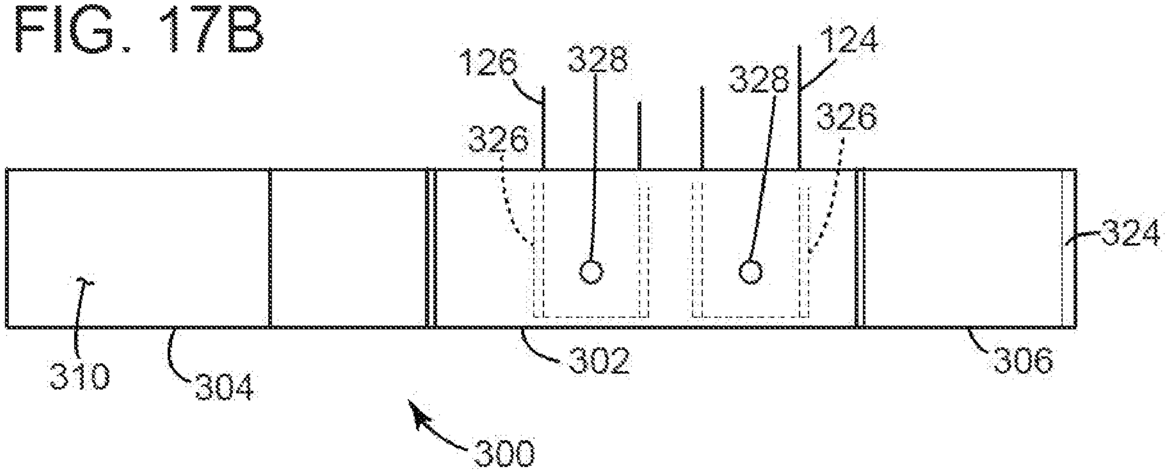
FIG. 17B depicts an example of a top view of a drive-on adapter according to aspects disclosed herein.

Referring to FIGS. 17A and 17B, an example of a perspective view (FIG. 17A) and a top view (FIG. 17B) of a drive-on adapter 300 is depicted according to aspects disclosed herein. The drive-on adapter 300 is engageable with the two-post vehicle lift system 100. The drive-on adapter 300 may be included in the adapter system 170.

The drive-on adapter 300 includes an adapter frame 302, a ramp 304 and a runway 306. The adapter frame 302 is operable to have a wheel of the material handling vehicle 10 driven thereon.

The ramp 304 is removably connected to a first end 308 of the adapter frame 302. The ramp 304 includes an inclined surface 310 extending from an upper level end 312 to a lower level end 314. The lower level end 314 has a height 316 sized to allow the wheel of the material handling vehicle 10 to drive over. For example, the height 316 of the lower level end 314 may be one half inch or less, one quarter inch or less, or one eighth inch or less. The upper level end 312 has a height 318 substantially equal to a height 320 of the adapter frame 302. For example, the height 318 of the upper level end 312 may be within one half inch or less of the height 320, may be within one quarter inch or less of the height 320, or may be within one eighth inch or less of height 320.

The runway 306 is removably connected to a second end 322 of the adapter frame 302. The runway 306 is operable to have the wheel of the vehicle 10 driven thereon. A mechanical stop 324 is disposed on a distal end of the runway 306 and is operable to stop the wheel once the wheel abuts against the mechanical stop 324.

A pair of platform slots 326 are disposed on a side of the adapter frame 302. The slots 326 are operable to removably engage a pair of swing arm platforms 124, 126 of a post 104.

A pair of frame attachment pin holes 328 are disposed on the frame 302. The frame attachment pin holes 328 are positioned to align with the attachment pin holes 136 (best seen in FIG. 3B) of the swing arm platforms 124, 126, when the swing arm platforms are inserted into the platform slots 326. The frame attachment pin holes 328 are sized to slidably receive an attachment pin 164 (best seen in FIG. 7) to securely lock the swing arm platforms 124, 126 to the adapter frame 302.

During operation, a pair of drive-on adapters 300 are used, wherein one drive-on adapter 300 is connected to swing arm platforms 120, 122 of the first post 102 and the other drive-on adapter 300 is connected to swing arm platforms 124, 126 of the second post 104. When the wheels of the vehicle 10 drive over the drive-on adapters and up to the mechanical stops 324 of the runways 306, and when the two posts 102, 104 lift the swing arm platforms 120, 122, 124, 126, the adapter frame 302 is lifted off of the ramp 304 and runway 306 to engage and lift the vehicle 10.

It should be appreciated that all combinations of the foregoing concepts and additional concepts discussed in greater detail herein (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

Although the invention has been described by reference to specific examples, it should be understood that numerous changes may be made within the spirit and scope of the inventive concepts described. Accordingly, it is intended that the disclosure not be limited to the described examples, but that it have the full scope defined by the language of the following claims.

What is claimed is:

1. A low profile adapter removably engageable with a two-post vehicle lift system, the low profile adapter comprising:

a support member;

a base plate rigidly connected to a bottom portion of the support member, the base plate extending longitudinally in a first direction from a first side of the support member;

at least one capture plate rigidly connected to the support member and extending longitudinally in a second direction from an opposing second side of the support member, wherein the first direction is opposite the second direction relative to the support member, the at least one capture plate having at least one adapter attachment pin hole positioned to align with an attachment pin hole of at least one swing arm platform of the vehicle lift system, wherein the low profile adapter is operable to pivotally attach to the at least one swing arm platform by an attachment pin inserted through the at least one attachment pin hole and the attachment pin hole of the at least one swing arm platform; and an outrigger arm capture member having a first leg and a second leg rigidly connected together at a substantially right angle, the first leg having a distal end portion operable to be connected to an upper portion of the support member and the second leg having a distal end portion operable to be connected to the base plate to form a drive-thru slot;

wherein the drive-thru slot is sized to slidably receive an outrigger arm of a material handling vehicle.

2. The low profile adapter of claim 1, wherein the outrigger arm capture member is rigidly attached to the base plate and the support member.

3. The low profile adapter of claim 1, wherein the outrigger arm capture member is pivotally connected to one of the base plate and the support member and removably connected to the other of the base plate and the support member.

* * * * *